(12) United States Patent
Bradbury et al.

(10) Patent No.: US 10,235,297 B2
(45) Date of Patent: Mar. 19, 2019

(54) MECHANISM FOR CREATING FRIENDLY TRANSACTIONS WITH CREDENTIALS

(71) Applicant: International Business Machines Corporation, Armonk, NY (US)

(72) Inventors: Jonathan D. Bradbury, Poughkeepsie, NY (US); Fadi Y. Busaba, Poughkeepsie, NY (US); Michael Karl Gschwind, Chappaqua, NY (US); Valentina Salapura, Chappaqua, NY (US); Eric M. Schwarz, Gardiner, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/932,726

(22) Filed: Nov. 4, 2015

(65) Prior Publication Data
US 2017/0123992 A1    May 4, 2017

(51) Int. Cl.
*G06F 12/0877* (2016.01)
*G06F 9/46* (2006.01)
(Continued)

(52) U.S. Cl.
CPC ........ *G06F 12/0877* (2013.01); *G06F 3/0622* (2013.01); *G06F 3/0659* (2013.01);
(Continued)

(58) Field of Classification Search
CPC .. G06F 12/0877; G06F 3/0622; G06F 3/0659; G06F 3/0673; G06F 2212/1041;
(Continued)

(56) References Cited

U.S. PATENT DOCUMENTS

| 5,940,838 A * | 8/1999 | Schmuck | ............ G06F 12/0862 |
| 6,339,813 B1 * | 1/2002 | Smith, III | ........... G06F 12/0859 |
| | | | 711/133 |

(Continued)

OTHER PUBLICATIONS

Rajwar, Ravi, and James R. Goodman. "Speculative lock elision: Enabling highly concurrent multithreaded execution." Proceedings of the 34th annual ACM/IEEE international symposium on Microarchitecture. IEEE Computer Society, 2001.*

(Continued)

*Primary Examiner* — Mano Padmanabhan
*Assistant Examiner* — Andrew J Cheong
(74) *Attorney, Agent, or Firm* — Peter J. Edwards

(57) ABSTRACT

A transactional memory execution environment receives a first request from a first transaction to access a cache line. A first request is received from a first transaction to access a cache line. The cache line is determined to be used by a second transaction. The first transaction and the second transaction opt-in to a transaction potential conflict check. The transaction potential conflict check determines if the first transaction and the second transaction are in a conflicting coherent state. The conflicting coherent state occurs when the first transaction is modifying the cache line used by the second transaction. The first transaction is allowed access to the cache line without aborting the second transaction in response to a determination that the first transaction and the second transaction are compatible from the transaction potential conflict check.

10 Claims, 14 Drawing Sheets

(51) Int. Cl.
*G06F 12/1045* (2016.01)
*G06F 12/0817* (2016.01)
*G06F 3/06* (2006.01)

(52) U.S. Cl.
CPC ............ *G06F 3/0673* (2013.01); *G06F 9/467* (2013.01); *G06F 12/0828* (2013.01); *G06F 12/1045* (2013.01); *G06F 2212/1041* (2013.01); *G06F 2212/281* (2013.01); *G06F 2212/60* (2013.01); *G06F 2212/621* (2013.01); *G06F 2212/682* (2013.01)

(58) Field of Classification Search
CPC .. G06F 2212/281; G06F 9/467; G06F 3/0611; G06F 3/0637; G06F 12/0808; G06F 12/0828; G06F 12/1466; G06F 13/1663; G06F 2212/502; G06F 2212/7202; G06F 9/526; G06F 9/30087; G06F 9/466; G06F 9/5016; G06F 12/0844
See application file for complete search history.

(56) References Cited

U.S. PATENT DOCUMENTS

| | | | |
|---|---|---|---|
| 6,785,803 B1 | 8/2004 | Merchant et al. | |
| 6,874,059 B1* | 3/2005 | Russ | G06F 12/1425 707/999.1 |
| 7,496,726 B1 | 2/2009 | Nussbaum et al. | |
| 7,676,636 B2* | 3/2010 | Cypher | G06F 12/08 711/141 |
| 7,805,575 B1* | 9/2010 | Agarwal | G06F 12/0811 711/141 |
| 8,516,202 B2* | 8/2013 | Heller, Jr. | G06F 9/467 711/145 |
| 9,471,313 B1* | 10/2016 | Busaba | G06F 9/30058 |
| 2002/0069335 A1* | 6/2002 | Flylnn, Jr. | G06F 3/0619 711/153 |
| 2002/0112178 A1* | 8/2002 | Scherr | G06F 21/80 726/4 |
| 2004/0181636 A1* | 9/2004 | Martin | G06F 12/0815 711/152 |
| 2004/0230760 A1* | 11/2004 | Check | G06F 9/30043 711/168 |
| 2004/0230761 A1* | 11/2004 | Check | G06F 9/355 711/169 |
| 2005/0273576 A1* | 12/2005 | Wilson | G06F 9/30036 711/217 |
| 2007/0198714 A1 | 8/2007 | Faden | |
| 2009/0006769 A1* | 1/2009 | Blumrich | G06F 12/0831 711/146 |
| 2009/0313684 A1* | 12/2009 | Shah | G06F 21/335 726/7 |
| 2010/0153645 A1* | 6/2010 | Kim | G06F 12/0875 711/118 |
| 2010/0169582 A1* | 7/2010 | Hinton | G06F 12/0817 711/146 |
| 2010/0169870 A1* | 7/2010 | Dice | G06F 8/4441 717/141 |
| 2011/0047334 A1* | 2/2011 | Eichenberger | G06F 12/0842 711/141 |
| 2011/0191501 A1 | 8/2011 | Jang et al. | |
| 2011/0209155 A1* | 8/2011 | Giampapa | G06F 9/467 718/103 |
| 2011/0214165 A1 | 9/2011 | Jeffreys | |
| 2012/0179877 A1* | 7/2012 | Shriraman | G06F 9/524 711/141 |
| 2012/0204062 A1* | 8/2012 | Erickson | G06F 11/3636 714/35 |
| 2013/0173849 A1 | 7/2013 | Balakrishnan et al. | |
| 2013/0219130 A1 | 8/2013 | Zetterman et al. | |
| 2013/0332696 A1 | 12/2013 | Schmidt et al. | |
| 2014/0075515 A1 | 3/2014 | McColgan | |
| 2014/0156961 A1 | 6/2014 | Hadley | |
| 2015/0089636 A1 | 3/2015 | Martynov et al. | |
| 2015/0169358 A1* | 6/2015 | Busaba | G06F 9/467 711/150 |
| 2015/0242249 A1* | 8/2015 | Cain, III | G06F 12/0828 711/145 |
| 2015/0242347 A1* | 8/2015 | Bradbury | G06F 9/467 710/265 |
| 2015/0278121 A1* | 10/2015 | Gschwind | G06F 12/1416 711/125 |
| 2016/0103682 A1* | 4/2016 | Alexander | G06F 9/3834 711/125 |
| 2016/0179586 A1* | 6/2016 | Wang | G06F 9/528 711/125 |
| 2016/0378541 A1* | 12/2016 | Busaba | G06F 9/467 711/130 |
| 2016/0378542 A1* | 12/2016 | Busaba | G06F 9/467 711/121 |
| 2017/0017435 A1* | 1/2017 | Peeters | G06F 9/467 |
| 2017/0206035 A1* | 7/2017 | Kumar | G06F 3/061 |

OTHER PUBLICATIONS

Bradbury et al., "Mechanism for Creating Friendly Transactions with Credentials," U.S. Appl. No. 15/145,555, filed May 3, 2016.
Bradbury et al., "Mechanism for Creating Friendly Transactions with Credentials," U.S. Appl. No. 15/145,584, filed May 3, 2016.
List of IBM Patents or Patent Applications Treated as Related, signed May 2, 2016, 2 pages.
Jacobi et al., "Transactional Memory Architecture and Implementation for IBM System z," 2012 IEEE/ACM 45th Annual International Symposium on Microarchitecture (MICRO 45), Dec. 2012, pp. 25-36, Vancouver, British Columbia, Canada, IEEE Computer Society Conference Publishing Services (CPS). DOI: 10.1109/MICRO.2012.12.
Bradbury et al., "Mechanism for Creating Friendly Transactions with Credentials," U.S. Appl. No. 14/932,737, filed Nov. 4, 2015.
List of IBM Patents or Patent Application Treated as Related, dated Nov. 4, 2015, 2 pages.

* cited by examiner

MECHANISM FOR CREATING FRIENDLY TRANSACTIONS WITH CREDENTIALS

BACKGROUND

Aspects of the present disclosure relate to coordinating memory accesses from multiple processes, and more specifically to allowing one or more transactions to access shared memory locations through the cache subsystem by assigning specific tokens to one or more transactions.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

SUMMARY

According to an embodiment of the disclosure, a computer-implemented method for executing each portion of a stream of program instructions as a transaction for reliability, a computer system configured to support transactional execution mode processing may be provided.

One embodiment provides a computer-implemented method for granting access to a cache line in a transactional memory execution environment. The transactional memory execution environment may receive a first request from a first transaction to access a cache line. A first request is received from a first transaction to access a cache line. The cache line is determined to be used by a second transaction. The first transaction and the second transaction opt-in to a transaction potential conflict check. The transaction potential conflict check determines if the first transaction and the second transaction are in a conflicting coherent state. The conflicting coherent state occurs when the first transaction is modifying the cache line used by the second transaction. The first transaction is allowed access to the cache line without aborting the second transaction in response to a determination that the first transaction and the second transaction are compatible from the transaction potential conflict check.

Another embodiment provides a system for granting access to a cache line in a transactional memory execution environment. The system includes a memory or cache subsystem, and a processor device, and a system controller. The processor device is communicatively coupled to the memory, and the system controller. The system controller is configured to receive a first request from a first transaction to access a cache line. A first request is received from a first transaction to access a cache line. The system controller is configured to determine that the cache line is used by a second transaction. The system controller is configured to determine that the first transaction and the second transaction have opted-in to a transaction potential conflict check. The system controller is configured to determine with the transaction potential conflict check if the first transaction and the second transaction are in a conflicting coherent state. The conflicting coherent state occurs when the first transaction is modifying the cache line used by the second transaction. The system controller is configured to allow the first transaction access to the cache line without aborting the second transaction in response to a determination that the first transaction and the second transaction are compatible from the transaction potential conflict check.

Yet another embodiment provides a computer program product for granting access to a cache line in a transactional memory execution environment. The computer program product includes a computer readable storage medium with a computer readable program stored therein. The computer readable program is then executed on a computing device. The computing device is configured to receive a first request from a first transaction to access a cache line. A first request is received from a first transaction to access a cache line. The computing device is configured to determine that the cache line is used by a second transaction. The computing device is configured to determine that the first transaction and the second transaction have opted-in to a transaction potential conflict check. The computing device is configured to determine with the transaction potential conflict check if the first transaction and the second transaction are in a conflicting coherent state. The conflicting coherent state occurs when the first transaction is modifying the cache line used by the second transaction. The computing device is configured to allow the first transaction access to the cache line without aborting the second transaction in response to a determination that the first transaction and the second transaction are compatible from the transaction potential conflict check.

The above summary is not intended to describe each illustrated embodiment or every implementation of the present disclosure.

BRIEF DESCRIPTION OF THE DRAWINGS

One or more aspects of the present disclosed embodiments are particularly pointed out and distinctly claimed as examples in the claims at the conclusion of the specification. The foregoing and other objects, features, and advantages of the disclosed embodiment are apparent from the following detailed description taken in conjunction with the accompanying drawings in which:

Figure 1:
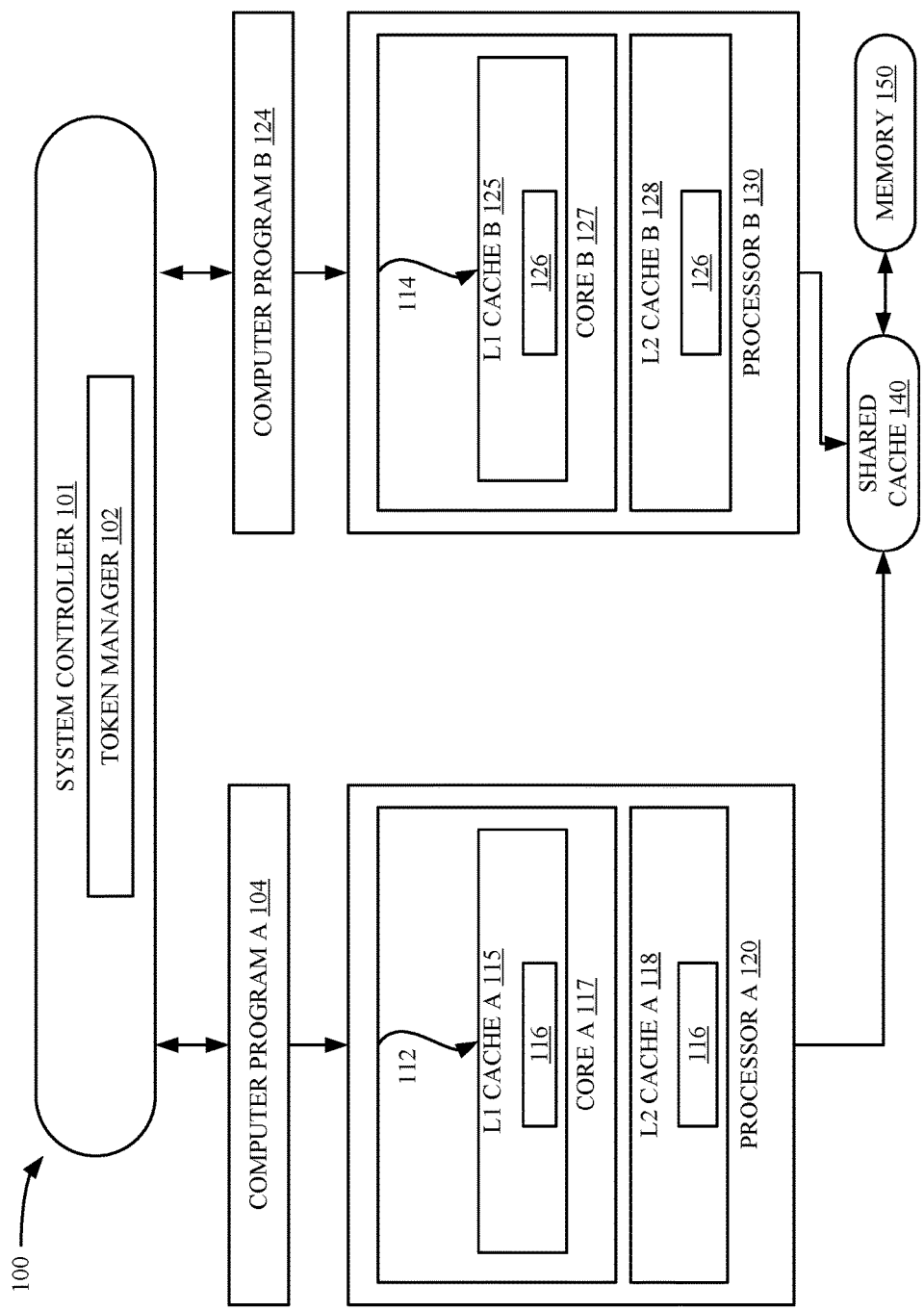
FIG. 1 depicts a schematic diagram of a transactional memory execution environment outlining a computer system capable of operating a token system, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to coordinating memory accesses from multiple processes, and more specifically to allowing one or more transactions to access shared memory locations through the cache subsystem by assigning specific tokens to one or more transactions. Transactions may opt-in to a transaction potential conflict check (conflict check). When transactions choose to opt-in to the transaction potential conflict check, their credentials may be compared to determine if a first transaction may access a cache line presently being occupied by a second transaction. A conflict between the first transaction and the second transaction might affect how the cache coherency states and handling affects the behavior of the transactions. If a first transaction and a second transaction are compatible, then they may be termed as a friendly relationship. If a first transaction and a second transaction are not compatible, then they may be termed as a hostile relationship. A token may be assigned when a transaction opt-in to a transaction potential conflict check. Compatible tokens may include transactions that when processed may not effect a current transaction that may also be in processing. Transactions with a friendly relationship may be assigned or able to reuse identical tokens and be allowed to access the same cache line while the transactions are both still active. Transactions with a hostile relationship, may be assigned unique (different) tokens and not be allowed to access the same cache line and keep the transactions alive. While the present disclosure is not necessarily limited to such applications, various aspects of the disclosure may be appreciated through a discussion of various examples using this context.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multiprocessor computer system (processor) may include individual or shared caches, memory interfaces, system bus, address translation mechanism, and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes, which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBE- GIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution may never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:
XABORT
CPUID
PAUSE In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV,

VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #55, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.
Generic Transaction Execution embodiments:

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

As explained further herein, transactional execution relies on cache coherency protocol to detect for and react to any potential transactional conflicts. The granularity of detection may be limited to a cache line. The cache line may include a manageable unit of data that reflects a fixed amount of data within the memory subsystem. With a traditional policy, if a transaction is reading a cache line while another transaction is writing the same cache line, only one of the transactions may be running at the same time, or one of the transactions may be aborted. This disclosure may relate to identifying how multiple transactions can access and modify the same cache line and stay active concurrently, within a computer system. The computer system may assign token types to a program, a process within a program, or a transaction within a process. The token types are then used during transactions to access memory data from the cache subsystem. The token types may include one or more tokens that may be assigned to transactions. The token types may include a first token and a second token. The token types are assigned based on certain credentials of the transactions, described further herein. After tokens are assigned, they are compared as part of the cache coherency protocol to determine the relationship between transactions. Transactions may have either a friendly relationship or a hostile relationship. Transactions with a friendly relationship may be assigned identical tokens and allowed to concurrently access the same cache line using an extended cache policy. Transactions with a hostile relationship may include two transactions that do not include identical tokens and may be handled using traditional cache policy. Friendly relationship and hostile relationship transactions will be described further herein.

In various embodiments, tokens, when used during transactions, may be compared to determine if they are compatible in terms of storing, reading, or modifying the data. When tokens are not used during transactions, the transactions may be considered incompatible with others; and conflicting accesses may be resolved with the traditional policy. In embodiments, tokens may be compatible if they are identical tokens. When a plurality of transactions are assigned identical tokens, they may be deemed friendly, wherein friendly refers to the relationship between transactions. When tokens and transactions are considered friendly, the friendly transactions may be allowed to concurrently access the same cache line with an extended cache policy. Such extended policy allows the transactions in a friendly relationship to read or write freely to the same cache line and traditional cache coherency protocols may be ignored. In order for that to happen, the computer system may suppress detection of cache coherent conflicts as in the traditional cache policy, with respect to transactional handling. Suppressing cache coherent conflicts may allow transactions that are writing within the same memory location to do so concurrently, thus overwriting each other's data. Contrary to the traditional cache policy, a conflicting coherent state may include two transactions accessing the same memory in a conflicting manner, such that a transaction may be writing while another transaction is reading the same cache line, or two transactions are writing to the same cache line concurrently. For example, a conflicting coherent state may include a first transaction and a second transaction sharing a same memory. The computer system disclosed may support transactional memory. Transactional memory systems may include a cache conflict detection mechanism that detects when multiple transactions are attempting to update the same data in a conflicting manner. To allow friendly transactions to update the same cache line concurrently, the cache subsystem may then stop detecting cache conflicts for the specific cache line, thus the computer system can suppress detection of cache coherent conflicts for that cache line.

A program, a process within a program, or a transaction within a process may communicate with a system controller (e.g., an operating system) and be assigned a token type. The system controller controls the list of tokens allocated in the computer system to support friendly transactions. After a token is obtained, when a transaction requests a new line in its local cache, the transaction may transmit the token to the cache subsystem if the transaction would like to do so in a transaction potential conflict check. In various embodiments, the cache line may be owned or not owned by any processor. When the cache line is not owned, the transaction may be granted immediate permission to the cache line, as there may not be any conflict. When the cache line is owned by another processor, the cache subsystem may forward the request and the token to the owning processor, upon which another transaction may be using the same cache line. In various embodiments, when the request and the token reach the current owner of the cache line, if a transaction is currently being processed, the token may be compared with a friendly or hostile list and the request may be accepted, rejected, delayed, or ignored. The protocols within the cache subsystem may be augmented to accept the request and allow both transactions to access the cache line, abort both transactions, abort one transaction, or delay the requesting transaction until the owning transaction is complete.

FIG. 1 depicts a schematic diagram of a computer system 100 capable of operating a token system within a transactional memory execution environment, according to various embodiments. As depicted, the computer system 100 may include a system controller 101, processors processor A 120 and processor B 130, and a shared cache 140, and a memory 150. In various embodiments, the system controller 101 may be stored on the memory 150. Additionally, the system controller 101 may include a token manager 102. Furthermore, the processors 120 and 130 may each include a core (core A 117 and core B 127), and a L2 cache (L2 cache A 118 and L2 cache B 128). The core A 117 and core B 127 may each include a L1 cache (L1 cache A 115 and L1 cache B 125), and each may be running a transaction, a first transaction 112 and a second transaction 114. Although the computer system 100 depicts two transactions, in other embodiments the computer system 100 may include any number of transactions. Additionally, although the computer system 100 is depicted herein with certain elements and implementations, the computer system 100 is not limited to these elements and implementations. In various embodiments, the computer system 100 includes a plurality of processors. In various embodiments, the processor A 120 or processor B 130 may be comprised of a plurality of cores, which may include core A 117 and core B 127 respectively. Additionally, in various embodiments, the processor A 120 and processor B 130 may include L1 cache A 115 and L1 cache B 125, a private L2 cache A 118 and L2 cache B 128, and some instances of shared cache 140. The shared cache 140 may include a hierarchy of cache structures (e.g. L3 and L4) which are shared by a plurality of lower level caches. The computer system 100 is not limited to the depicted arrangement of its elements. Some embodiments of the computer system 100 may include similar elements with similar implementations, arranged in another manner. In various embodiments, the core A 117 may include both L1 cache A 115 and L2 cache B 118, and the core B 127 may include both the L1 cache B 125 and L2 cache B 118B. Furthermore, the processor A 120 or the processor B 130 may include an additional shared one or more caches 140.

The system controller 101 operates within the computer system 100 and provides services for computer programs (computer program A 104 and computer program B 124). In various embodiments, the system controller 101 may be part of an operating system or a hypervisor. As depicted, the system controller 101 may include a token manager 102. The token manager 102 may enable the system controller 101 to manage a pool of tokens. In various embodiments, managing a pool of tokens includes housing tokens not in use, assigning a token type to the first transaction 112 and a token type to the second transaction 114, tracking tokens in use, acknowledging that the first transaction 112 and the second transaction 114 are completed, and accepting the returned tokens to a token pool in response to the acknowledgement of the completed transactions. For example, upon the completion of a transaction 112, the computer program 104 may signal the token manager 102 that its transaction 112 is completed and the token may be removed from its own usage, and be returned to the token manager 102. In various embodiments, the computer program 104 may keep the tokens until a plurality of transactions have been completed. In various embodiments, the token manager 102 may proactively reclaim the token from computer program 104; upon which the computer program 104 may need to re-request for a new token. The reclaimed token can be returned to a token pool, which stores unused tokens.

The assignation of a token type includes selecting a first token or a second token for the first transaction 112 and the second transaction 114. The token type may be referred to as a token after assignation by the system controller 101. Assigning a token type may include determining if the first transaction 112 and the second transaction 114 are within the same memory (address) space. The determination of the assignation of a token from the token types will be described further herein.

The processor 120 may contain a core 117 and L2 cache 118, and the core 117, with a L1 cache 115, may be running the first transaction 112. Additionally, the processor 130 may contain a core 127 and L2 cache 128, and the core 127, with a L1 cache 125, may be running the second transaction 114. As depicted, computer programs 104 and 124 may be dispatched from the system controller 101 to the processor A 120 and the processor B 130 respectively. The computer program A 104 and computer program B 124 may include a list of tasks and instructions to be completed by the computer system 100. In embodiments, the computer system 100 may be running a plurality of computer programs that may include computer program A 104 or computer program B 124. In various embodiments, the computer program A 104 and computer program B 124 may be composed of a plurality of threads. These individual threads may invoke one or more transactions as part of their instruction processing. In various embodiments, each thread may create one or more transactions, or multiple threads may create one transaction. When each thread may create one transaction, each the first transaction 112, and the second transaction 114 may be comprised of one thread. Alternatively, when multiple threads may create one transaction, each the first transaction 112, and the second transaction 114 may be comprised of a plurality of threads. The first transaction 112 and the second transaction 114 may access one or more memory locations. In various embodiments, a plurality of transactions may attempt to access memory locations in the same cache lines. For example, the first transaction 112, and second transaction 114 may attempt to access the same cache lines. The cache lines accessed by the first transaction 112 and the second transaction 114 may be within any cache level including L1 cache 115, L2 cache 118, or the shared cache 140. In various embodiments, the memory locations may be within L1 cache 115, or L2 cache 118, or shared cache 140, or in memory 150.

Each level of cache, including L1 cache 115 or 125 and L2 cache 118 or 128, may include a token qualifier 116 or 126. Although only L1 cache 115 or 125, L2 cache 118 or 128 and shared cache 140 are depicted in FIG. 1, the computer system 100 is not limited to these cache elements, nor these specific cache levels. For example, the shared cache 140 may be a shared L3 cache. The token qualifier 116 depicted in FIG. 1 may be used to augment the cache coherency protocol and its application to transactional executing handling, and thus the availability and accessibility of the cache line. The applications and implementations of the token qualifier 116 are further outlined herein.

The memory 150 may include one or more memory partitions within a memory subsystem that store the data of the transactions before entering the processor A 120 or processor B 130, and after being processed by the processor A 120 or processor B 130. The memory may include one or more storage partitions where data may be stored and accessed by the processors. The processor A 120 and/or processor B 130 may perform read/write operations on the memory 150 partitions. A first transaction 112 and a second transaction 114 may access the memory 150 through the processor 120 and the processor 130 respectively. The transactions A 112 and transaction B 114 may be processed by the processor A 120 and processor B 130 respectively. The results of the processing of transaction A 112 and transaction B 114 may be written back to the memory 150. In various embodiments, the transactions may include writing on the memory 150 by the processor A 120 or processor B 130 in the same address space that the transactions were originally read from.

As depicted, the processor 120 A and processor B 130 may connect to the memory 150 through the shared cache 140. In various embodiments, the memory 150 may be a random access memory (RAM). The memory 150 may include a memory subsystem. Some computer systems 100 may include a memory 150 partition within the memory subsystem. Other computer systems 100 may include a plurality of memory 150 partitions within the memory subsystem. The memory subsystem may include a memory hierarchy wherein a memory may include one or more memory partitions supporting one or more address spaces. The address spaces used by program A 104 or program B 124, known to the system controller 101, may be used to determine if a first transaction 112 and a second transaction 114 may share the same memory locations. A first transaction 112 and a second transaction 114 that does not share any address space may not share the same physical memory locations. To prevent a first transaction from conflicting with a second transaction, the cache subsystem may detect for the second transaction whether there are potential changes to the cache line by the first transaction 112, and may not allow access by the second transaction 114. Additionally, an address space mapping, usually called a page, may correspond to a range of memory addresses. In various embodiment, an address mapping may include one or more pages. In various embodiments, a plurality of address spaces may be found being used within a memory partition, or a singular address space is found within a memory partition. For example, the plurality of memory 150 partitions may include a first memory partition that may be separate from a second memory partition within the plurality of memory partitions, using different address spaces.

Figure 2:
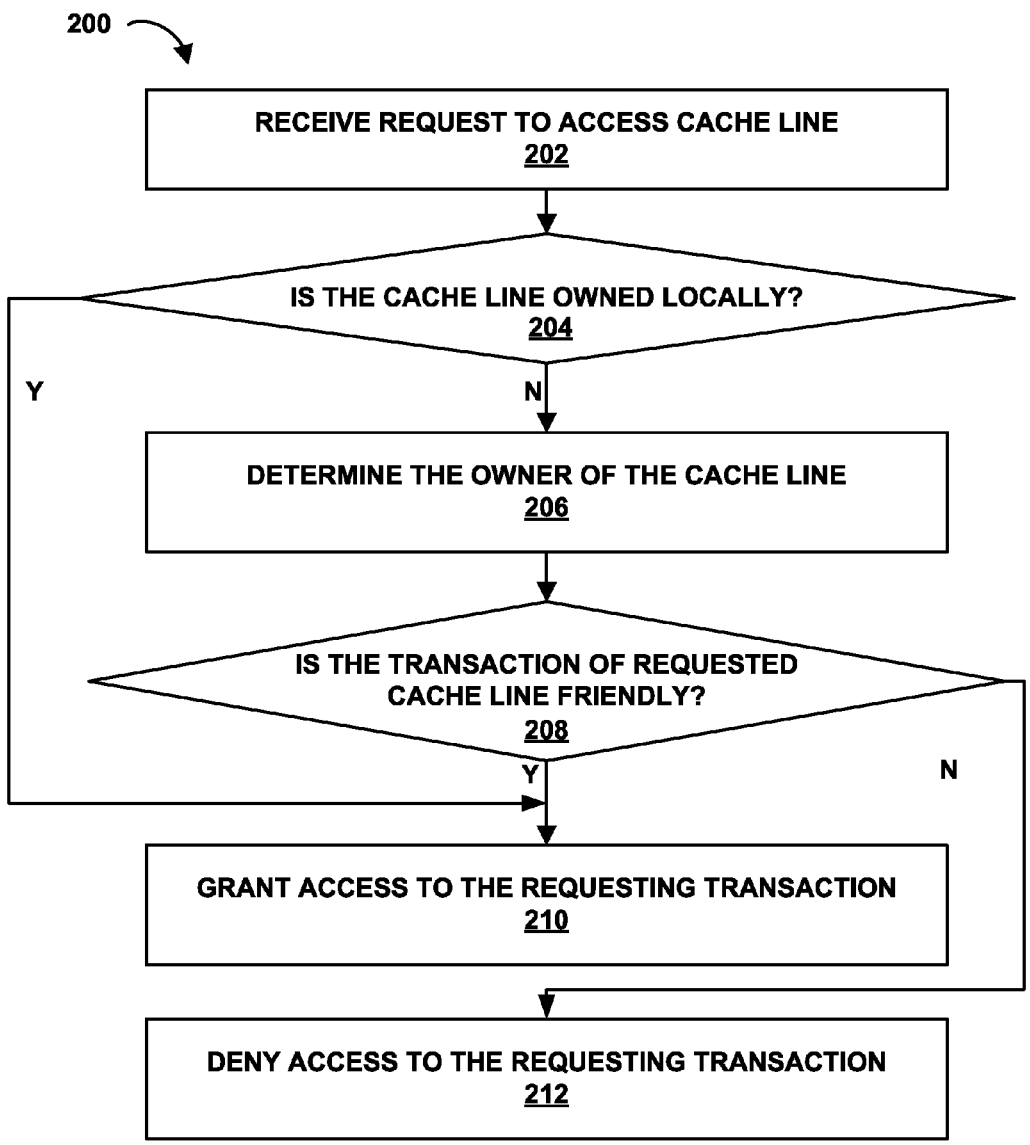
FIG. 2 presents a flowchart depicting a method for multiple transactions to access the same cache line of a transactional memory execution environment, according to various embodiments.

FIG. 2 depicts a flowchart of a computer-implemented method 200 for one or more transactions accessing a same cache line of a transactional memory execution environment, according to various embodiments. The computer-implemented method 200 may begin with operation 202, where a request is made to access a cache line. In operation 202, the request may be accompanied by a token type as part of the transaction processing, according to various embodiments. In various embodiments, in operation 202, the request to access the cache line may be read only, write only, or both read and write.

Then in operation 204, the local cache subsystem determines the ownership of the cache line. In various embodiments, the cache line may be already owned by the local cache (i.e. L1 cache 115 of core 117 of FIG. 1), or the cache line may be owned by another processor cache, or not in any other processor cache. An owned cache line in another processor's cache may have a transaction currently operating on the owned cache line. The cache subsystem may also determine the coherency states of the cache line as needed by the transactions. A conflicting coherent state may occur when both transactions are modifying the cache line, or when one transaction is modifying the cache while the other transaction is reading in the cache, wherein modifying the cache includes writing or storing. For example, a first transaction and a second transaction may be found to be in a conflicting coherent state if the first transaction and second transaction are attempting to write to different locations within the same cache line (i.e. false sharing). In an additional example, the first transaction and second transaction may be in a conflicting coherent state if they are writing within an overlapping address range of a memory. In various embodiments, the transactions are in a conflicted coherent state, or in an agreeable coherent state.

A token qualifier, as part of the cache protocol handler within any cache level, may determine tokens of transactions and adjust the protocol basing on whether the transactions have tokens, and the token types of the transactions involved. The transactions may be assigned token types by the token manager. In various embodiments, the transactions have identical tokens, or have different, unique tokens, or no tokens. Transactions that have identical tokens may be deemed friendly transactions and transactions that have different tokens or no tokens may be deemed hostile transactions, according to various embodiments. In some embodiments, transactions may support the use a list of token types to identify multiple friendly transactions.

If the cache line is currently used by a local cache, the computer-implemented method 200 may progress to operation 210. If the cache line is not owned by the local cache, the computer-implemented method 200 may progress to operation 206. In operation 206, the owner of the cache line is determined. The owner of the cache line may be another processor, which owns the cache line being accessed. The processor that owns the cache line may include the rights and responsibilities of the processing of the cache line. If the cache line is not currently used in a transaction, normal cache protocol applies. If another processor requests to access, read, write, or modify the cache line, then the owning processor may need to determine if the requested cache line is friendly. The owner may determine, using its token qualifier, if the owned cache line can be used by the requester.

The computer-implemented method 200 progresses from operation 206 to operation 208, where the token qualifier may determine if the cache line is currently used in a transaction (the owning transaction), and if so, whether the token of the cache line requester is friendly. If the cache line is currently used in a transaction, and if the current transaction does not allow friendly tokens, or have no tokens, then the requester may be hostile. If the cache line is currently used in a transaction, and the token of the cache line requester is not friendly, then the requester may be hostile. The token of the requesting transaction may be compared to the token of the owning transaction. If the token of the requesting transaction is the same as the owning transaction, then the requesting transaction may be granted permission to access the cache line currently owned by the owning transaction. If the requesting transaction is determined to be friendly of the owning transaction, then the operation 208 may progress to operation 210. If the requesting transaction is determined to be hostile to the owning transaction, then the operation 208 may progress to operation 212. In various embodiments, the requesting transaction has permission to access the cache line, or the transaction does not have permission to access the cache line. This process is further outlined herein.

In operation 210, the token qualifier may grant access of the cache line to the requesting transaction if the requesting transaction has permission without aborting a second transaction currently using the cache line. In various embodiments, the requesting transaction has permission to access the cache line if the token of the requesting transaction is compatible to the token of the second transaction, wherein the second transaction is currently using the cache line. In some embodiments, the requesting transaction and the second transaction may be compatible because the token of the requesting transaction and the token of the second transaction are the same. Alternatively, the transactions may be incompatible because the token of the requesting transaction is missing, or different, and unique, from the token of the second transaction. The transactions may also be incompatible if the second transaction does not include a token. Although not shown, if the transactions are both accessing the cache line for read usage, there may not be any conflict, and access may be granted regardless of the token values.

In operation 212, the requesting transaction is denied access to the requested cache line. If the requesting transaction is determined to be hostile, the access may be denied until the owning transaction completes. The requesting transaction and the second transaction are therefore incompatible and the requesting transaction may not use the requested cache line without aborting the second transaction. In various embodiments, the requesting transaction may be given access to the requested cache line and the second transaction may be aborted.

Figure 3:
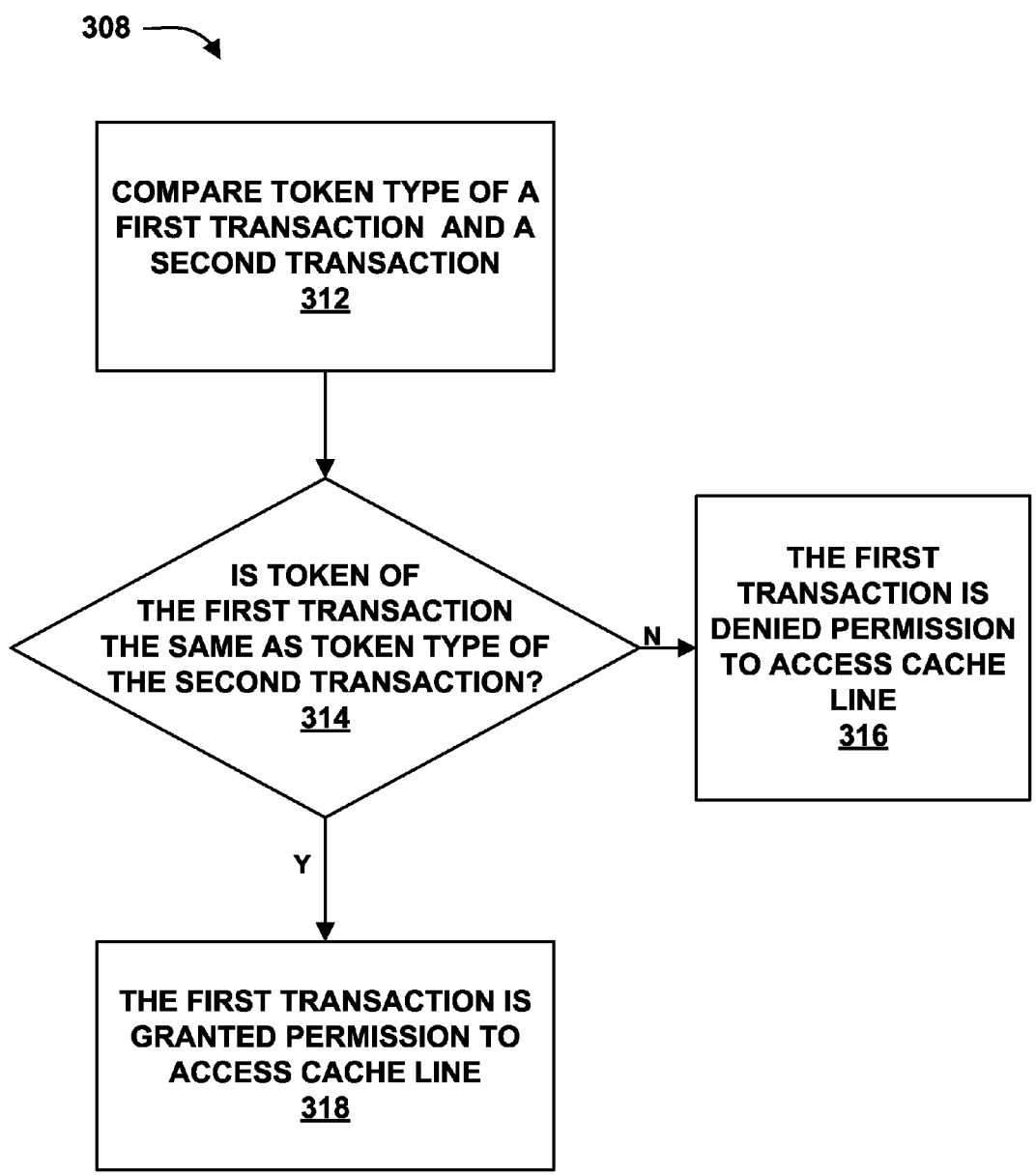
FIG. 3 presents a flowchart depicting a method of determining if a transaction is allowed to access an owned cache line of a transactional memory execution environment, according to various embodiments.

FIG. 3 presents a flowchart depicting a computer-implemented method 308 of determining if a transaction is allowed to access a cache line in use by another transaction of a transactional memory execution environment, according to various embodiments. The determination of the computer-implemented method 308 includes the use of tokens that accompanies the request for comparing compatibility of a requesting transaction and the owning transaction to determine a potential conflict check. The requesting transaction may include a first token, and the owning transaction may include a first token or a second token. The depicted computer-implemented method 308 may further outline operation 208 from FIG. 2.

In operation 312, the token qualifier of the cache owning the cache line may compare the tokens of two different transactions, wherein a second transaction is running on the processor as the owning transaction and is operating on the cache line and a first transaction is requesting to access the same cache line of the second transaction. Tokens may have been previously assigned to the transactions by the token manager, within the system controller.

In operation 314, the token qualifier may determine the relationship between the tokens of the transactions. In various embodiments, the token of the first transaction is the same as the token of the second transaction, or the token of the first transaction is different, and unique, from the token of the second transaction. For example, the first transaction may include a first token, and the second transaction may also include the first token. Since the tokens are the same, the first transaction may have access to the cache line currently used by the second transaction and may result in the first transaction and second transaction being determined as friendly transactions. In an additional example, the first transaction may include a first token, and the second transaction may include a second token. The first token and the second token may be different, resulting in the first transaction and the second transactions being determined as hostile transactions. If either the first or the second transaction does not have a token, the transactions are determined to be hostile transactions. If the first token is assigned to a first transaction and the second token is assigned to a second transaction, the first transaction and the second transaction may not be allowed concurrently access the same cache line.

In various embodiments, the tokens of the transactions may not be the same but may be compatible with each other. A token may be assigned by the token qualifier to each transaction, and the token qualifier may include a compatibility list wherein each token may include a set of tokens of which the token is compatible. For example, a first token may include a set of tokens of which the first token is compatible, including the first token, a seventeenth token, and a one-hundred and forty-seventh token. In an additional example, a fifth token may be incompatible with any other token including the fifth token, wherein the set of the fifth token would include no tokens that the fifth token is compatible.

In operation 316, the token qualifier may determine that the first transaction may not have permission to access the cache line concurrently with the second transaction. The first transaction and the second transaction may be termed hostile transactions. The first transaction may not be able access the cache line without aborting either the first transaction or the second transaction. In various embodiments, the first transaction may be aborted, or the second transaction may be aborted. The method of aborting transactions is further outlined herein.

In operation 318, the token qualifier may determine that the first transaction has permission to access the cache line concurrently with the second transaction. The two transactions, the first transaction and the second transaction, may then be considered friendly transactions. In various embodiments, friendly transactions are able to concurrently access the same cache line without aborting either transaction.

In various embodiments, depending on the cache protocol of the computer system, the transactions can access different parts of the cache line concurrently. In various embodiments, depending on the cache protocol of the computer system, the cache line may be owned alternatively among the transactions without aborting either transactions. In various embodiments, more than two transactions can be considered friendly transactions, and be able to access cache lines concurrently.

Figure 4:
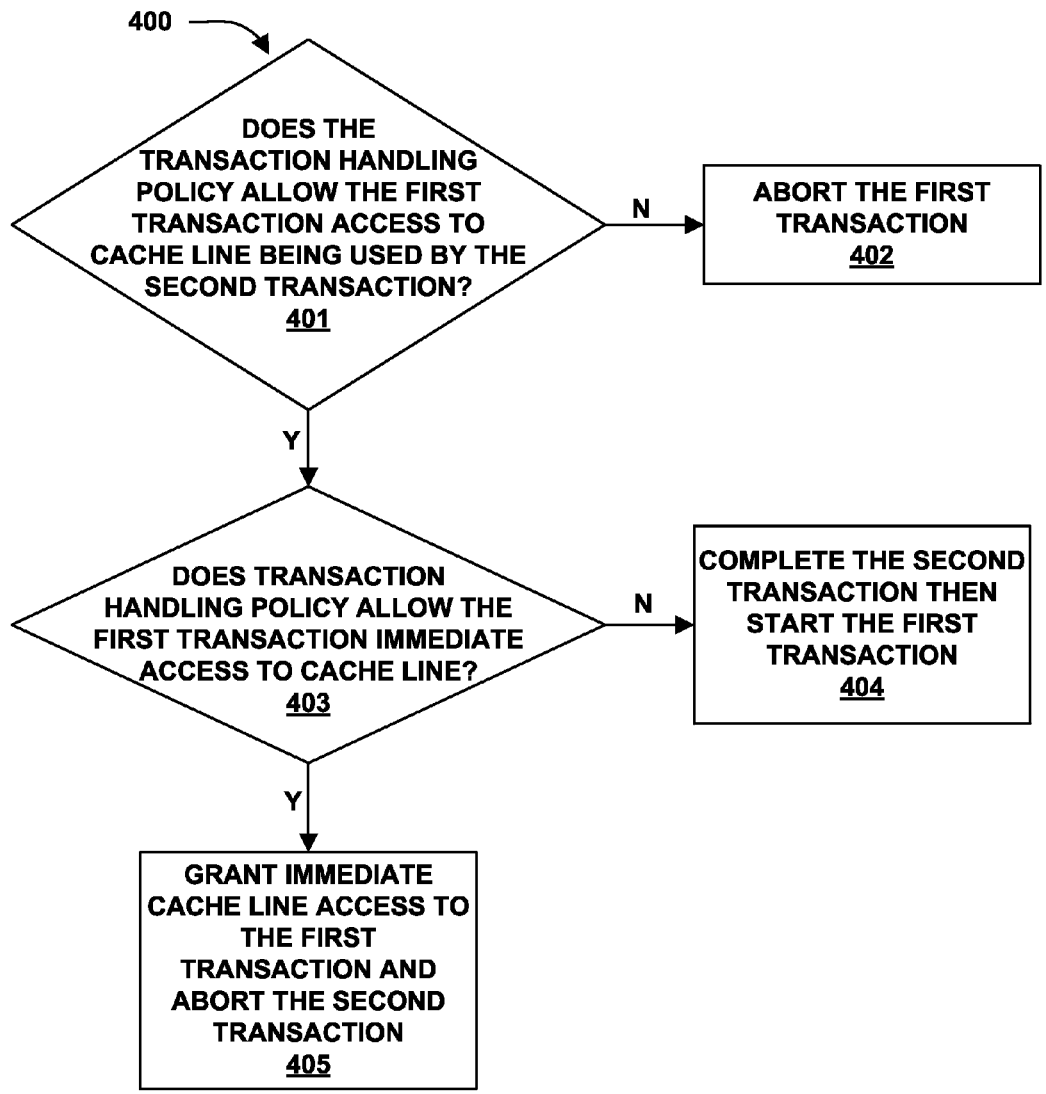
FIG. 4 presents a flowchart depicting a method of aborting transactions when a transaction is not able to access an owned cache line of a transactional memory execution environment, according to various embodiments.

FIG. 4 presents a flowchart depicting a computer-implemented method 400 of aborting one or more transactions when the transactions are not able to access a cache line concurrently in a transactional memory execution environment, according to various embodiments. When transactions are not able to access the same cache line concurrently without aborting either transaction, they may then be deemed hostile transactions. Hostile transactions may require one or more of the transactions to be aborted to prevent overlapped and conflicting accesses in memory, violating the general atomic nature of a transaction. The computer-implemented method 400 may involve two hostile transactions. In various embodiments, the first transaction is attempting to access an owned cache line and the second transaction has ownership of the cache line and is currently operating on the cache line.

In operation 401, it is determined whether the transaction handling policy allows a first transaction access to the owned cache line. The transaction handling policy may be determined by a token qualifier, which may determine which transaction, if any, may be forced to be aborted. The transaction handling policy may determine that two transactions are friendly and are able to concurrently access the same cache line. Alternatively, the transaction handling policy may determine that one or more hostile transactions may force one of the transactions to be aborted. Operation 401 involves two hostile transactions, therefore the transaction handling policy may determine that a transaction may have to abort.

The transaction handling policy may determine that the first transaction is not allowed to access the owned cache line; therefore, the first transaction may be aborted. Subsequently, the second transaction may be allowed to continue accessing the cache line. Once the first transaction is aborted, the transaction may relinquish its token, wherein the token was previously assigned to the transaction by the token manager. In various embodiments, the first transaction relinquishes the token by returning the token to the token manager. If the token is returned, the token manager may then re-assign the token to another transaction. Alternatively, the first transaction may be retried with the same token. Transactions may relinquish their token once their transactions are complete. Alternatively, a program may relinquish its token after a number of transactions are completed.

In operation 402, the first transaction is aborted. The first transaction may be retried, or the program may progress using an alternate non-transactional set of instructions. In various embodiments, the retried first transaction may be accessing a cache line used by a third transaction. The transaction handling policy may be reevaluated from the view of the third transaction, and the first transaction may be allowed to access the cache line. If the first transaction may not be allowed to access the cache line, then the first transaction may be aborted again.

In operation 403, the transaction handling policy may determine that the first transaction could be allowed to access the owned cache line. In various embodiments, the first transaction may not be allowed immediate access to the cache line, or the first transaction is allowed immediate access to the cache line. These embodiments are further outlined herein. If the transaction handling policy determines that the first transaction does not receive immediate access to the cache line, then the computer-implemented method 400 may progress to operation 404. If the transaction handling policy determines that the first transaction may receive immediate access to the cache line, then the computer-implemented method 400 may progress to operation 405.

In various embodiments, the transaction handling policy may include a hierarchy that may be used to determine the priority of accesses and which transaction may have immediate access. A transaction may include an identifier that determines the position of the transaction on the hierarchy of the handling policy. For example, the handling policy may determine that a first transaction has an identifier of a high importance on the hierarchy, and a second transaction has an identifier of a low importance. The first transaction may be granted immediate access to the cache line.

In operation 404, the transaction handling policy may determine that the first transaction is not allowed immediate access to the cache line, thus the first transaction waits until the second transaction is completed, wherein the second transaction has ownership of the cache line and continues to operate on it. Once the second transaction is completed and finished accessing the cache line, the first transaction may then access the cache line. After the second transaction is completed, the transaction may then relinquish its token back to the token manager within the system controller.

In operation 405, the first transaction may be allowed immediate access to the cache line. Upon access of the first transaction to the cache line, the second transaction may be aborted. After the second transaction is aborted, the transaction may relinquish its token and return the token to the token manager within the system controller. Once the second transaction is aborted, the first transaction may then be allowed to carry out its operations. In various embodiments, the second transaction may be retried. The second transaction may be reassigned a token and wait until the first transaction has been completed. Alternatively, the second transaction may not relinquish its token, and immediate be retried with the same token.

Figure 5:
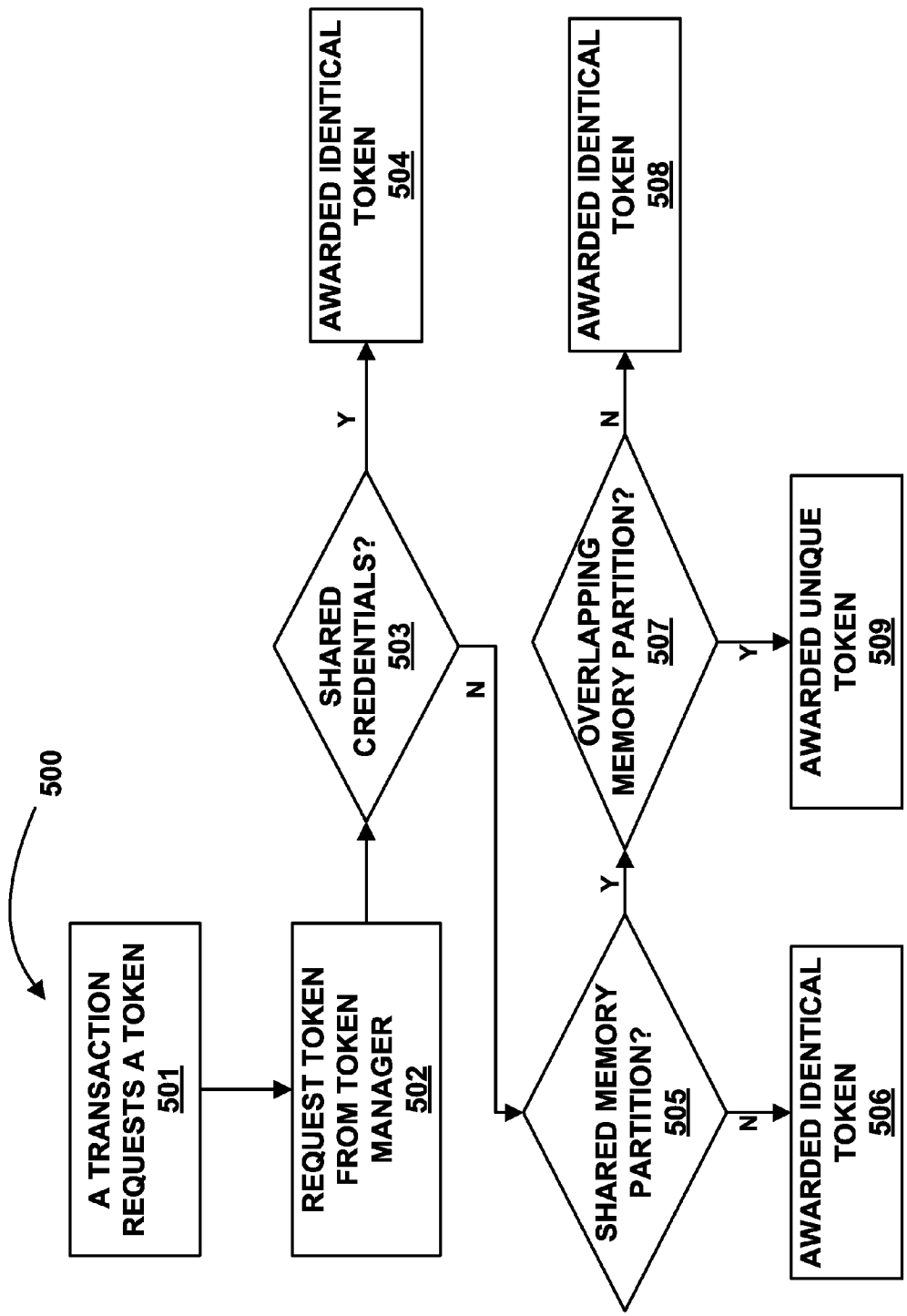
FIG. 5 presents a flowchart depicting the process of assigning a token type to a transaction, according to various embodiments.

FIG. 5 presents a flowchart depicting the computer-implemented method 500 of assigning a token type to a transaction, according to various embodiments. The computer-implemented method 500 depicted in the diagram may be executed by a token manager within the system controller. The computer-implemented method 500 may include a program requesting a token for a transaction from the token manager that may assign a token type to the transaction that includes either token that is identical or unique to another transaction. The unique tokens may be different from another token assigned to another transaction. The computer-implemented method 500 may be termed as a transaction potential conflict check or conflict check herein. The assignment of a token may be termed a token type where the transaction may receive a token.

In operation 501, a program is processing a first transaction that requires a token. The program may determine that the first transaction would benefit from establishing a friendly relationship with other transactions (e.g., a second transaction) that may be running concurrently. The friendly relationship of the first transaction and other friendly transactions may include concurrently accessing the same cache lines without aborting each other. In this computer-implemented method 500, a first transaction may be the transaction requesting to access an owned cache line including a second transaction, which may be the ongoing transaction that currently has ownership of the cache line and is actively accessing it.

In operation 502, the program may request a token from a token manager for the first transaction with credentials identifying that the first transaction may be eligible to enter a friendly relationship with the second transaction. A determination of a friendly relationship may require a transaction potential conflict check, which compares the credentials of one or more transaction to determine which transactions are compatible with each other. For example, the transaction potential conflict check may determine if the first transaction may be in a conflicting coherent state with the second transaction. Such credentials may include some form of process ID, or application ID. The token manager may be operating within the system controller. The token manager may manage a pool of available tokens and which processes have requested one. The token manager may also keep a table of credentials that relates to the processes, which have requested a token for their transactions. Transactions may use a token when they would like to have a friendly relationship with another transaction. In various embodiments, transactions may opt-in to the transaction potential conflict check, or transactions may not opt-in to the friendly transaction potential conflict check. When transactions opt-in to the transaction potential conflict check, the program may then request a token from the token manager. When transactions do not opt-in to the transaction potential conflict check, the program may not request a token from the token manager. In various embodiments, transactions that did not opt-in to the transaction potential conflict check may not be assigned a token type and may be treated as normal handling, wherein normal handling is the current cache protocol when multiple transactions attempt to access the same cache line. In the case where a transaction did not opt-in, the transaction may be deemed as a hostile transaction to all other transactions.

In operation 503, the token manager may determine, based on the credentials accompanying the token request, if the first transaction is friendly with the second transaction that already exists in a tracking table. If the credentials show the first transaction may be a friend with the existing second transaction, the computer-implemented method 500 may progress to operation 504. If the first transaction does not have credentials to be a friend with the second transaction, or does not want to be a friend with any existing transaction, then the computer-implemented method 500 may progress to operation 505. In various embodiments, the first transaction does not share memory partitions with the second transaction, or the first transaction does share memory partitions with the second transaction.

In operation 504, the first transaction may be assigned a token type of a token identical to the token of the second transaction. If they share the same memory, then conflicts may occur when reading/writing on the same memory or the same cache line. Because the two transactions are assigned identical tokens, they may be deemed friendly transactions and may be able to concurrently access the same cache line. This operation is further outlined herein.

Identical tokens may include two or more tokens that share the same token type. For example, a first transaction may be assigned a token type of a first token if the first transaction is not reading/writing the same memory as a second transaction located on a first cache line that currently in possession of a first token. For example, if the first transaction is assigned a first token, then the first transaction may access the first cache line currently accessed by a second transaction because the first token of the first transaction is identical to the first token of the second transaction.

In various embodiments, identical tokens may include two or more tokens that are compatible but may not include a same identifier (i.e. the same number). Tokens may include a set of compatible tokens that they may pair up with. If a token is compatible with another token, then they may be considered identical as well as friendly, and the corresponding transactions may be allowed to concurrently access the same cache line. For example, a first token and a fourth token may be compatible. If a first transaction has a first token, and a second transaction has a fourth token, then the first transaction and the second transaction may be allowed to concurrently access the same cache line.

In operation 505, the first transaction may not be treated as a friend of the second transaction. In this operation, the token manager may determine if the first transaction shares a same memory partition with the second transaction. If the first transaction and the second transaction do not share the same memory partition, then they may not conflict with each other. If the first transaction and the second transaction do not conflict, then the computer-implemented method 500 may progress to operation 506. Since the transactions may not conflict, the token manager can assign the same token as the one used by the second transaction. This allows tokens to be reused across transactions that may not conflict with each other. In various embodiments, the first transaction and the second transaction may not share address space, or the first transaction does share address space with the second transaction which may result in the computer implemented method progressing to operation 506. If the first transaction and the second transaction share the same memory partition, then the computer-implemented method 500 may progress to operation 507.

Unique tokens or different tokens may be assigned to one or more transactions if two or more transactions share a same memory space, and they are not friends with each other. The shared memory space may include a shared address space or an overlapping address space within the memory partition. If two hostile transactions share the same memory space then they may be assigned token types that are unique to one another. For example, a first transaction and a second transaction may share a same address space within the shared memory partition. Because the first transaction and the second transaction share the same address space, the first transaction may be awarded a first token and the second transaction may be awarded a second token that is unique from the first token.

In operation 507, the first transaction shares the same memory partition with the second transaction. Therefore, the token manager may determine if the two different address spaces overlap. In various embodiments, the address space of the first transaction overlaps the address space of the second transaction, or the address space of the first transaction does not overlap the address space of the second transaction. If the first transaction and the second transaction do not share or overlap address space, then the computer-implemented method 500 may progress to operation 508. Similar to operation 506, since the two transaction may not collide, the token manager may assign the same token as the one used by the second transaction. This allows tokens to be reused across transactions that may not conflict with each other. If the first transaction and the second transaction overlap address space, then the computer-implemented method 500 may progress to operation 509.

In operation 508, the address spaces of the first and second transactions do not overlap, thus the two transactions may be assigned a token type of identical tokens and may be allowed to concurrently access the same cache line.

In operation 509, the address spaces of the first and second transactions overlap. Therefore, the two transactions may be assigned token types of two different, unique tokens and may be deemed hostile transactions that are not allowed to concurrently access the same cache line.

In various embodiments, a transaction may be allowed to be assigned an identical token, but may request a unique token. The transaction may pass the transaction potential conflict check (i.e. operation 504, operation 506, or operation 508) but still request a token that is unique. For example, a first transaction may be assigned a first token and a second transaction may opt-out to a transaction potential conflict check. The second transaction may pass the transaction potential conflict check and may be assigned the first token that is identical to the first token of the first transaction, but request a second token that is unique from the first token of the first transaction.

Figure 6:
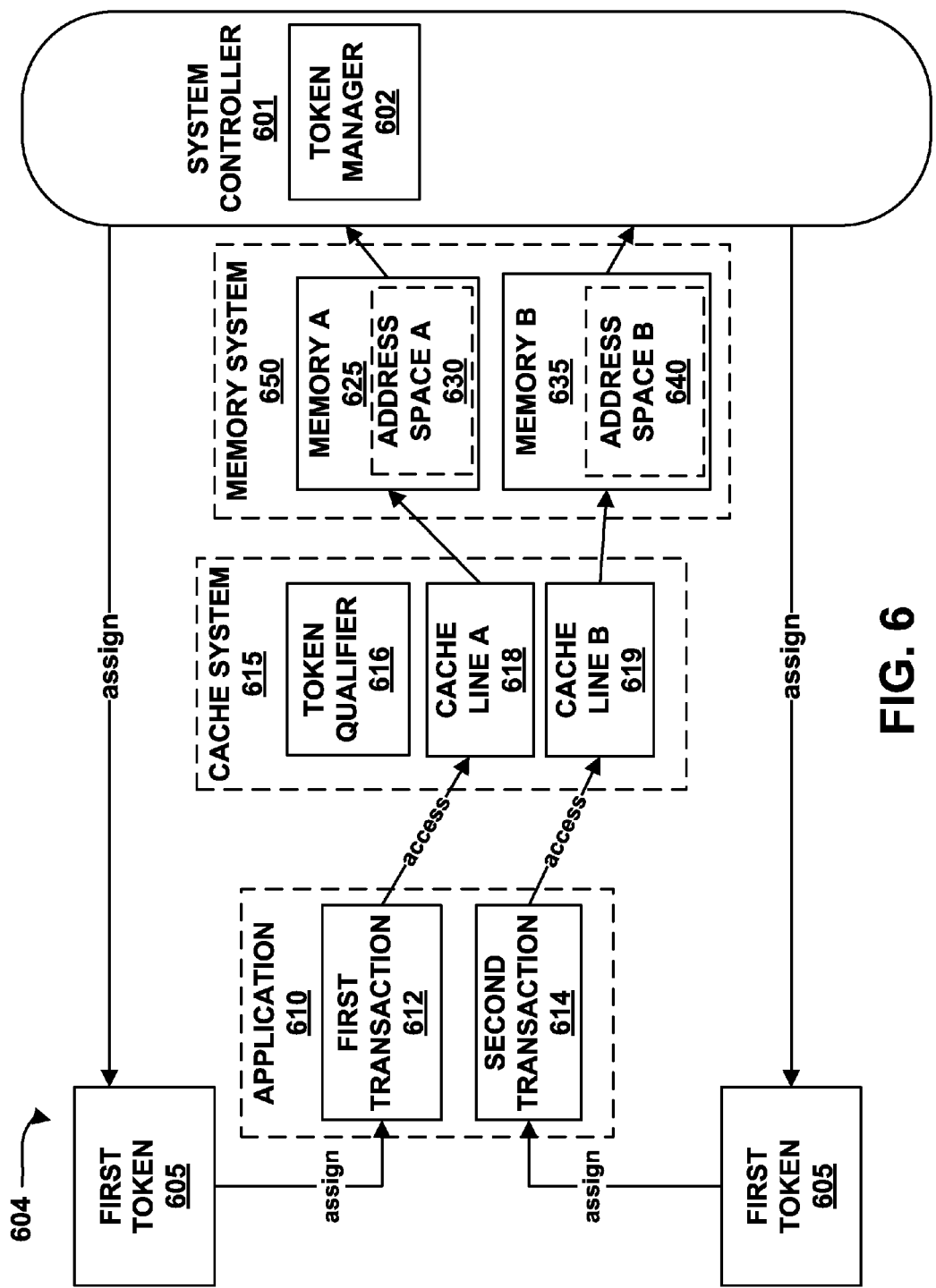
FIG. 6 depicts a schematic diagram of a transactional memory execution environment for determining an assignation of identical tokens to a first transaction and a second transaction, which utilize different memory partitions, according to various embodiments.

FIG. 6 depicts a schematic diagram of a transactional memory execution environment 604 for determining an assignation of identical tokens to a first transaction and a second transaction, which utilize different memory partitions, according to embodiments. In various embodiments, the depicted memory execution environment 604 may further outline operation 504 from FIG. 5. As depicted, the memory execution environment 604 may include an application 610, a cache system 615, a memory system 650, and a system controller 601. Additionally, the transactional memory execution environment 604 may include two copies of a first token 605 that are assigned to the first transaction 612 and the second transaction 614 by the token manager 602. Although FIG. 6 outlines certain elements and certain implementations, the depicted memory execution environment 604 is not limited to these elements and implementations.

As depicted, the application 610 may include a first transaction 612 and a second transaction 614. The first transaction 612 and the second transaction 614 may correspond to the first transaction 112 and the second transaction 114 from FIG. 1. In various embodiments, the first transaction 612 may request to access the cache line 618 and immediately gains ownership of the cache line 618. Additionally, the second transaction 614 may request to access the cache line 619 while the first transaction is still active, wherein the cache line 618 is owned by the first transaction 612.

The memory system 650 may include two separate memory partitions, memory A 625, and memory B 635. Furthermore, each memory partition may include an address space. As depicted, memory A 625 may include address space A 630, and memory B 635 may include address space B 640. The memory system 650 may correspond to the memory 150 from FIG. 1. The memory system 650 is not limited to the depicted elements and arrangements. For example, the memory system 650 may include a plurality of memory partitions and a plurality of address spaces within each memory partition. In various embodiments, the first transaction 612 is within address space A 630 and memory A 625, and the second transaction 614 is within address space B 640 and memory B 635.

As depicted, the system controller 601 may include a token manager 602. The implementation of the system controller 601 and the token manager 602 may correspond to the implementation of the system controller 101 and the token manager 102 in FIG. 1. In various embodiments, the token manager 602 may determine that the first transaction 612 is within a first address space and a first memory partition and that the second transaction 614 is within a second address space and a second memory partition, and thus assigns token types of a first token 605 to both the first transaction 612 and a first token 605 to the second transaction 614.

The cache system 615 may include both a token qualifier 616, a cache line 618 and a cache line 619. The cache lines 618 and 619 may correspond to any level of cache. Additionally, the elements and implementation of the token qualifier 616 may correspond to the elements and implementation of the token qualifier 116 from FIG. 1. In various embodiments, the token qualifier 616 compares the first token 605, assigned to the first transaction 612, to the first token 605, assigned to the second transaction 614 and determines that the first token 605 of the first transaction 612 and the first token 605 of the second transaction 614 are identical tokens. Since the transactions may not access the same cache line, and may not have any conflicts, the tokens being compatible may not influence any transactional related cache.

Figure 7:
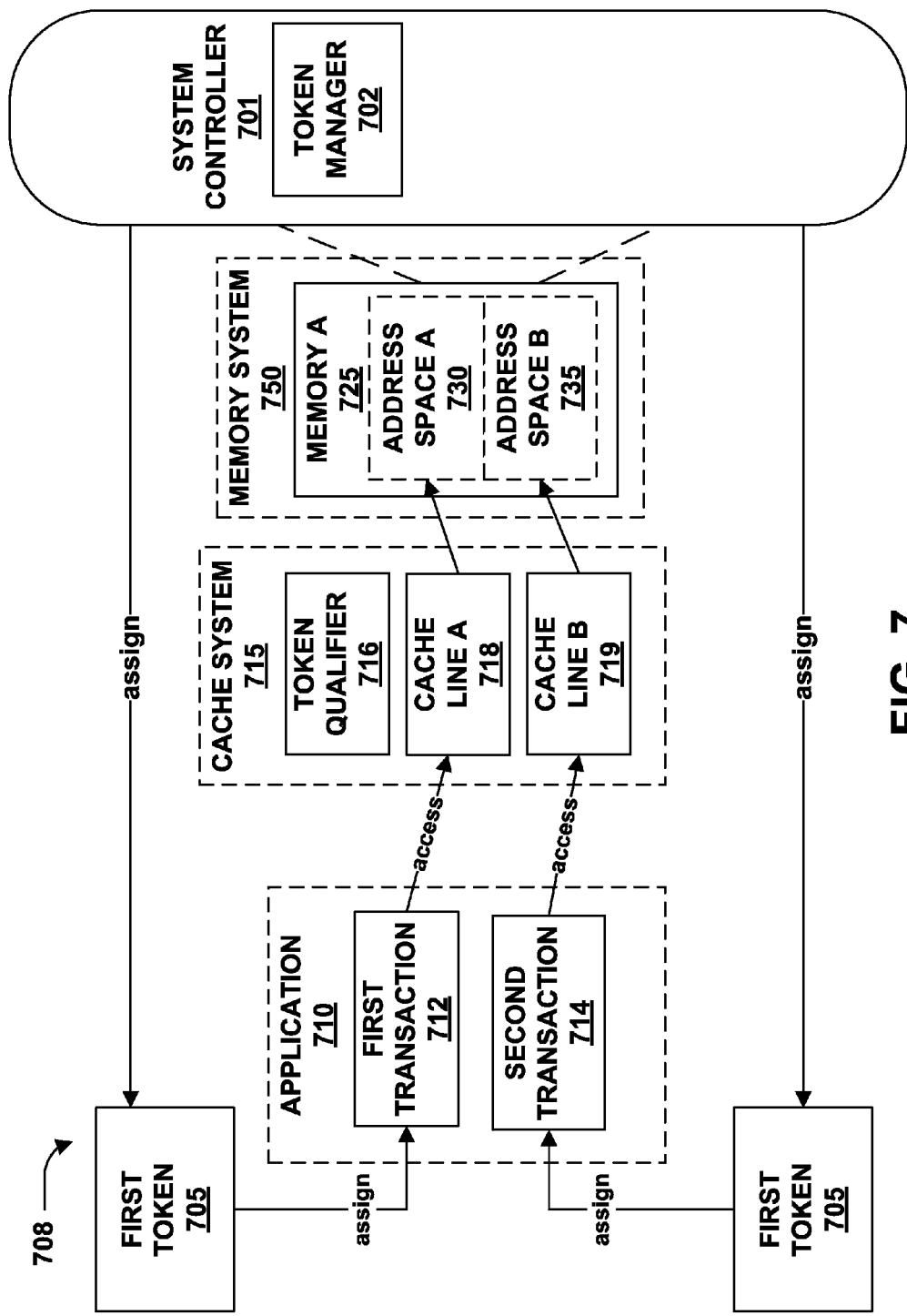
FIG. 7 depicts a schematic diagram of a transactional memory execution environment for determining an assignation of identical tokens to a first transaction and a second transaction, which utilize different non-overlapping address space within the same memory partition, according to various embodiments.

FIG. 7 depicts a schematic diagram of a transactional memory execution environment 708 for determining an assignation of identical tokens to a first transaction and a second transaction, which utilize different non-overlapping address space within the same memory partition, according to embodiments. The depicted memory execution environment 708 may further outline operation 508 from FIG. 5. As depicted, the memory execution environment 708 may include an application 710, a cache system 715, a memory system 750, and a system controller 701. Additionally, the transactional memory execution environment 708 may include two copies of the first token 705 that are assigned to the first transaction 712 and the second transaction 714 by the token manager 702. Although FIG. 7 outlines certain elements and certain implementations, the depicted memory execution environment 708 is not limited to these elements and implementations.

As depicted, the application 710 may include the first transaction 712 and the second transaction 714. The first transaction 712 and the second transaction 714 may correspond to the first transaction 112 and the second transaction 114 from FIG. 1. In various embodiments, the first transaction 712 may request to access the cache line 718 and immediately gains ownership of the cache line 718. Additionally, the second transaction 714 may request to access the cache line 719 while the first transaction is still active, wherein the cache line 718 is owned by the first transaction 712.

The memory system 750 may include one memory partition, memory A 725, and two distinct address spaces, address space A 730 and address space B 735, within memory A 725. This memory system 750 may correspond to the memory 150 from FIG. 1. The memory system 750 is not limited to the depicted elements and arrangements. For example, the memory system 750 may include a plurality of memory partitions and a plurality of address spaces within each memory partition. In various embodiments, the first transaction 712 is within address space A 730, which is within memory A 725, and the second transaction 714 is within address space B 735, which is also within memory A 725. The address space A 730 and the address space B 735 are non-overlapping within the memory A 725 of the memory system 750.

The system controller 701 may include a token manager 702. The implementation of the system controller 701 and the token manager 702 may correspond to the implementation of the system controller 101 and the token manager 102 in FIG. 1. In various embodiments, the token manager 702 determines that the first transaction 712 is within a first address space and a first memory partition and that the second transaction 714 is within a second address space and a first memory partition, and thus assigns a token type of a first token 705 to both the first transaction 712 and a first token to the second transaction 714.

The cache system 715 may include both a token qualifier 716, a cache line 718 and a cache line 719. The cache lines 718 and 719 may correspond to any level of cache. Additionally, the elements and implementation of the token qualifier 716 may correspond to the elements and implementation of the token qualifier 616 from FIG. 6, as well as the token qualifier 116 from FIG. 1. In various embodiments, the token qualifier 716 compares the first token 705, assigned to the first transaction 712, to the first token 705, assigned to the second transaction 714, and determines that the first token 705 and the first token 705 are identical tokens. Since the transactions may not access the same cache line, and may not have any conflicts, the tokens being compatible may not influence any transactional related cache.

Figure 8:
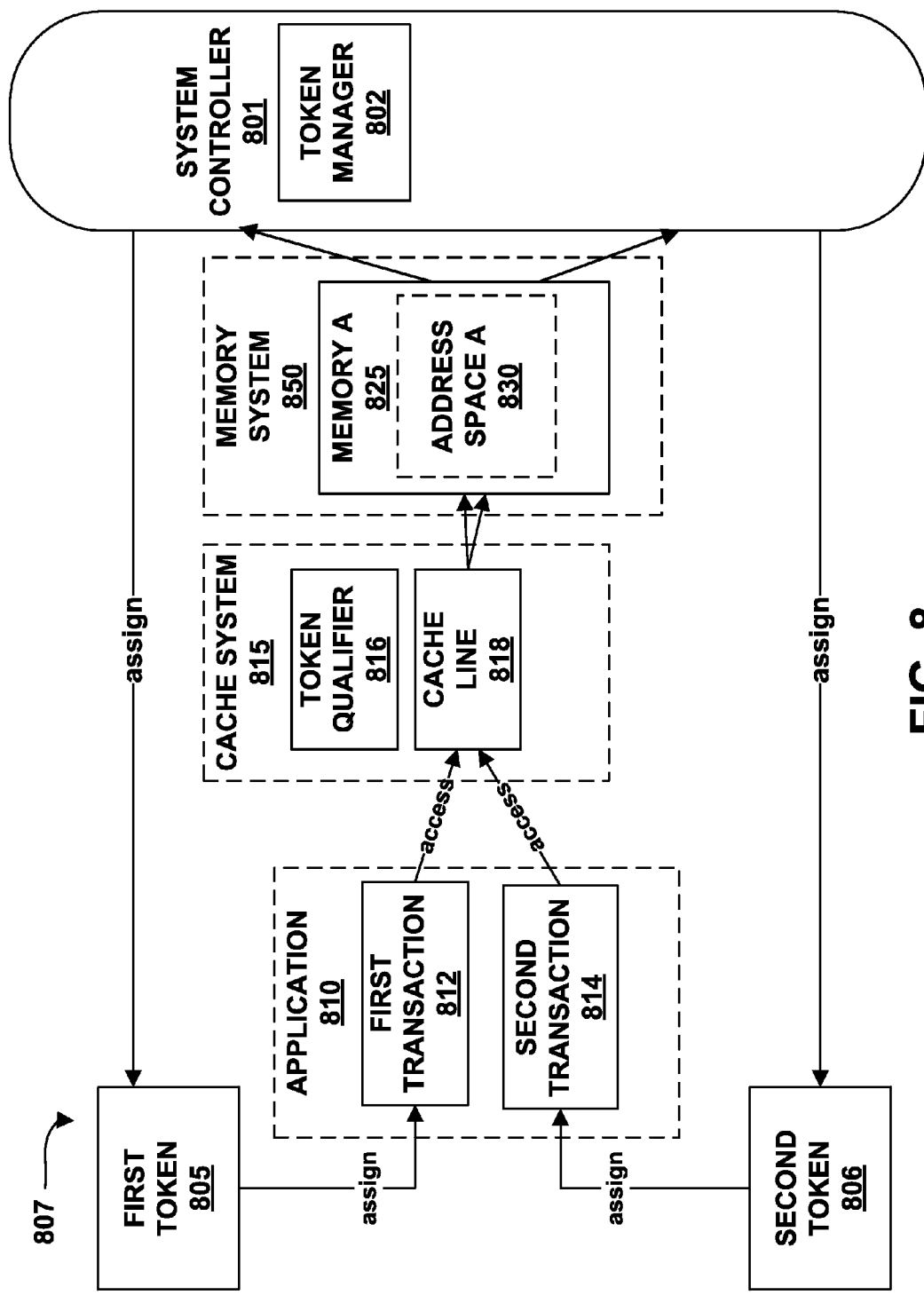
FIG. 8 depicts a schematic diagram of a transactional memory execution environment for determining an assignation of unique tokens to a first transaction and a second transaction, which utilize the same address space within the same memory partition, according to various embodiments.

FIG. 8 depicts a schematic diagram of a transactional memory execution environment 807 for determining an assignation of unique tokens to a first transaction and a second transaction, which utilize the same address space within the same memory partition, according to embodiments. The depicted memory execution environment 807 may further outline operation 507 from FIG. 5. As depicted, the memory execution environment 807 may include an application 810, a cache system 815, a memory system 850, and a system controller 801. Additionally, the transactional memory execution environment 807 may include a first token 805 and a second token 806 that are assigned to the first transaction 812 and the second transaction 814 respectively, by the token manager 802. Although FIG. 8 outlines certain elements and certain implementations, the depicted memory execution environment 807 is not limited to these elements and implementations.

The application 810 may include the first transaction 812 and the second transaction 814. The first transaction 812 and the second transaction 814 may correspond to the first transaction 112 and the second transaction 114 from FIG. 1. In various embodiments, the first transaction 812 may request to access the cache line 818 and immediately gain ownership of the cache line 818. Additionally, the second transaction 814 may request to access the cache line 818 while the first transaction is active, wherein the cache line 818 is owned by the first transaction 812.

As depicted, the memory system 850 may include one memory partition, memory A 825, as well as one address space, address space A 830, within memory A 825. The memory system 850 may correspond to the memory 150 from FIG. 1. The memory system 850 is not limited to the depicted elements and arrangements. For example, the memory system 850 may include a plurality of memory partitions and a plurality of address spaces within each memory partition. In various embodiments, both the first transaction 812 and the second transaction 814 are within memory A 825 and address space A 830.

The system controller 801 may include a token manager 802. The implementation of the system controller 801 and the token manager 802 may correspond to the implementation of the system controller 101 and the token manager 102 from FIG. 1. In various embodiments, the token manager 802 determines that the first transaction 812 is within a first address space and a first memory partition and that the second transaction 814 is also within a first address space and a first memory partition, and thus assigns a token type of a first token 805 to the first transaction 812 and a second token 806 to the second transaction 814.

As depicted, the cache system 815 may include both a token qualifier 816 and a cache line 818. The cache line 818 may correspond to any level of cache. Additionally, the elements and implementation of the token qualifier 816 may correspond to the elements and implementation of the token qualifier 116 from FIG. 1. In various embodiments, the token qualifier 816 compares the first token 805, assigned to the first transaction 812, to the second token 806, assigned to the second transaction 814, and determines that the first token 805 and the second token 806 are not identical tokens. If the first token 805 and the second token 806 are not compatible, then they are not both able to access the cache line 818 without aborting either the first transaction 812 or the second transaction 814. In some embodiments, the first transaction 812 may be allowed to continue accessing the cache line 818, and the second transaction 814 may be forced to abort the transaction. Alternatively, the first transaction 812 may be allowed to continue accessing the cache line 818 until the transaction is complete, then the second transaction 814 may be allowed to access the cache line 818, after the first transaction 812 is complete. Alternatively, the first transaction 812 may be immediately aborted, and the second transaction 814 may be allowed to access the cache line 818.

Figure 9:
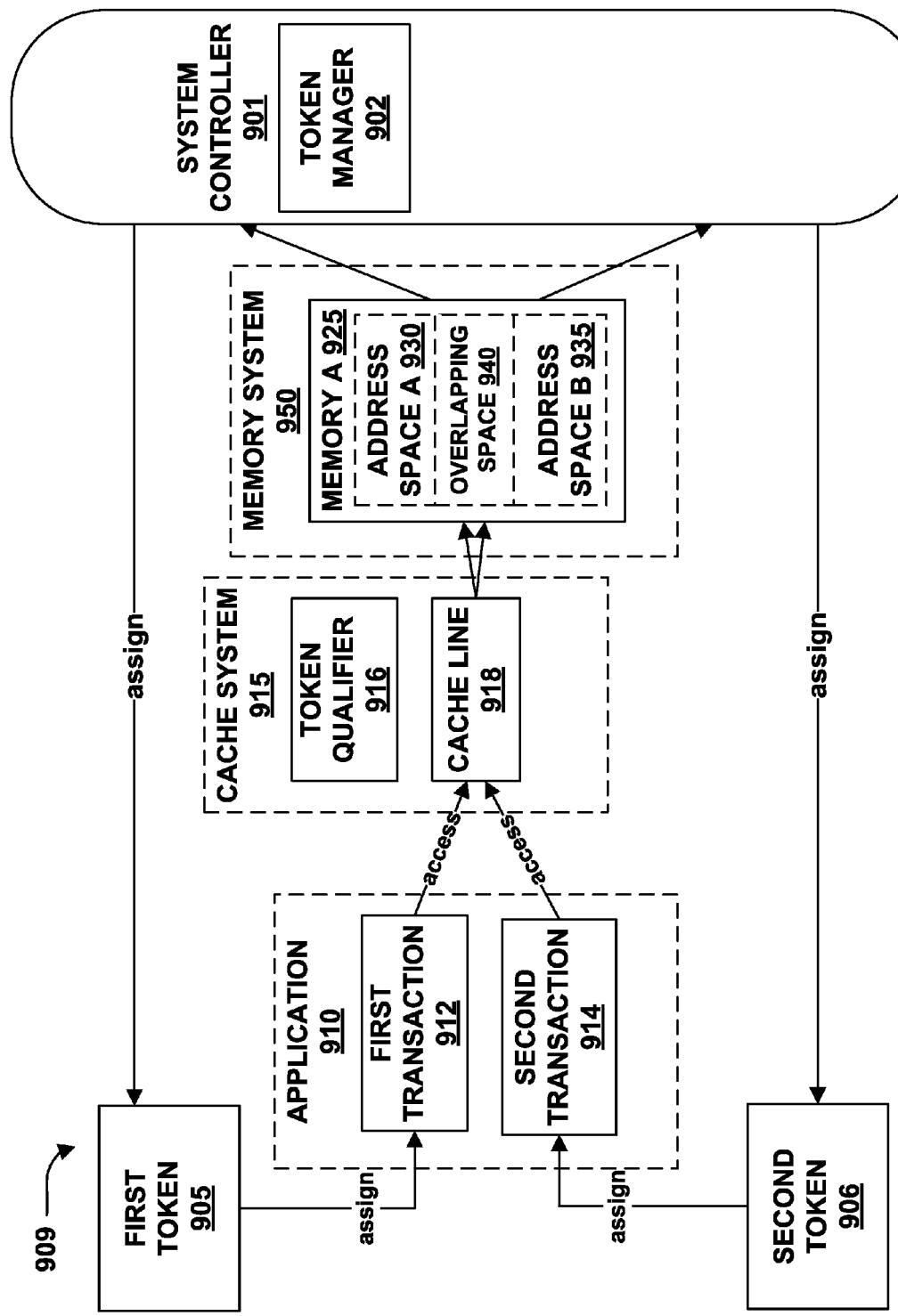
FIG. 9 depicts a schematic diagram of a transactional memory execution environment for determining an assignation of unique tokens to a first transaction and a second transaction, which utilize different, but overlapping, address spaces within the same memory partition, according to various embodiments.

FIG. 9 depicts a schematic diagram of a transactional memory execution environment 909 for determining an assignation of unique tokens to a first transaction and a second transaction, which utilize different, but overlapping, address spaces within the same memory partition, according to embodiments. The depicted memory execution environment 909 may further outline operation 509 from FIG. 5. The memory execution environment 909 may include an application 910, a cache system 915, a memory system 950, and a system controller 901. Additionally, the transactional memory execution environment 909 may include a first token 905 and a second token 906 that are assigned to the first transaction 912 and the second transaction 914 respectively, by the token manager 902. Although FIG. 9 outlines certain elements and certain implementations, the depicted memory execution environment 909 is not limited to these elements and implementations.

As depicted, the application 910 may include the first transaction 912 and the second transaction 914. The first transaction 912 and the second transaction 914 may correspond to the first transaction 112 and the second transaction 114 from FIG. 1. In various embodiments, the first transaction 912 may request to access the cache line 918 and immediately gain ownership of the cache line 918. Subsequently, the second transaction 914 requests to access the cache line 918 while the first transaction is active, wherein the cache line 918 is owned by the first transaction 912.

The memory system 950 may include one memory partition, memory A 925. Furthermore, memory A 925 may include two separate, but overlapping address spaces. The two address spaces, a first address space, address space A 930, and a second address space, address space B 935, may have a third address space, an overlapping space 940, that overlaps the first address space and the second address space, between them. The memory system 950 may correspond to the memory 150 from FIG. 1. The memory system 950 is not limited to the depicted elements and arrangements. For example, the memory system 950 may include a plurality of memory partitions and a plurality of address spaces within each memory partition. In various embodiments, both the first transaction 912 and the second transaction 914 are within the overlapping space 940.

As depicted, the system controller 901 may include a token manager 902. The implementation of the system controller 901 and the token manager 902 may correspond to the implementation of the system controller 101 and the token manager 102 from FIG. 1. In various embodiments, the token manager 902 determines that the first transaction 912 is within a first memory partition and an overlapping address space 940, and that the second transaction 914 is also within a first memory partition and an overlapping address space, and thus assigns a token type of a first token 905 to the first transaction 912 and a second token 906 to the second transaction 914.

The cache system 915 may include both a token qualifier 916 and a cache line 918. The cache line 918 may correspond to any level of cache. Additionally, the elements and implementations of the token qualifier 916 may correspond to the elements and implementations of the token qualifier 116 from FIG. 1. In various embodiments, the token qualifier 916 compares the first token 905, assigned to the first transaction 912, to the second token 906, assigned to the second transaction 914, and determines that the first token 905 and the second token 906 are not identical tokens. The first token and the second token are not compatible and are not both able to access the cache line 918 without aborting either transaction. In some embodiments, the first transaction 912 may be allowed to continue accessing the cache line 918, while the second transaction 914 may be forced to abort the transaction. Alternatively, the first transaction 912 may be allowed to continue accessing the cache line 918 until the transaction is complete, and then the second transaction 814 may be allowed to access the cache line 918, after the first transaction 912 has been completed. Alternatively, the first transaction 912 may be immediately aborted, and the second transaction 914 may be allowed to access the cache line 918.

Figure 10:
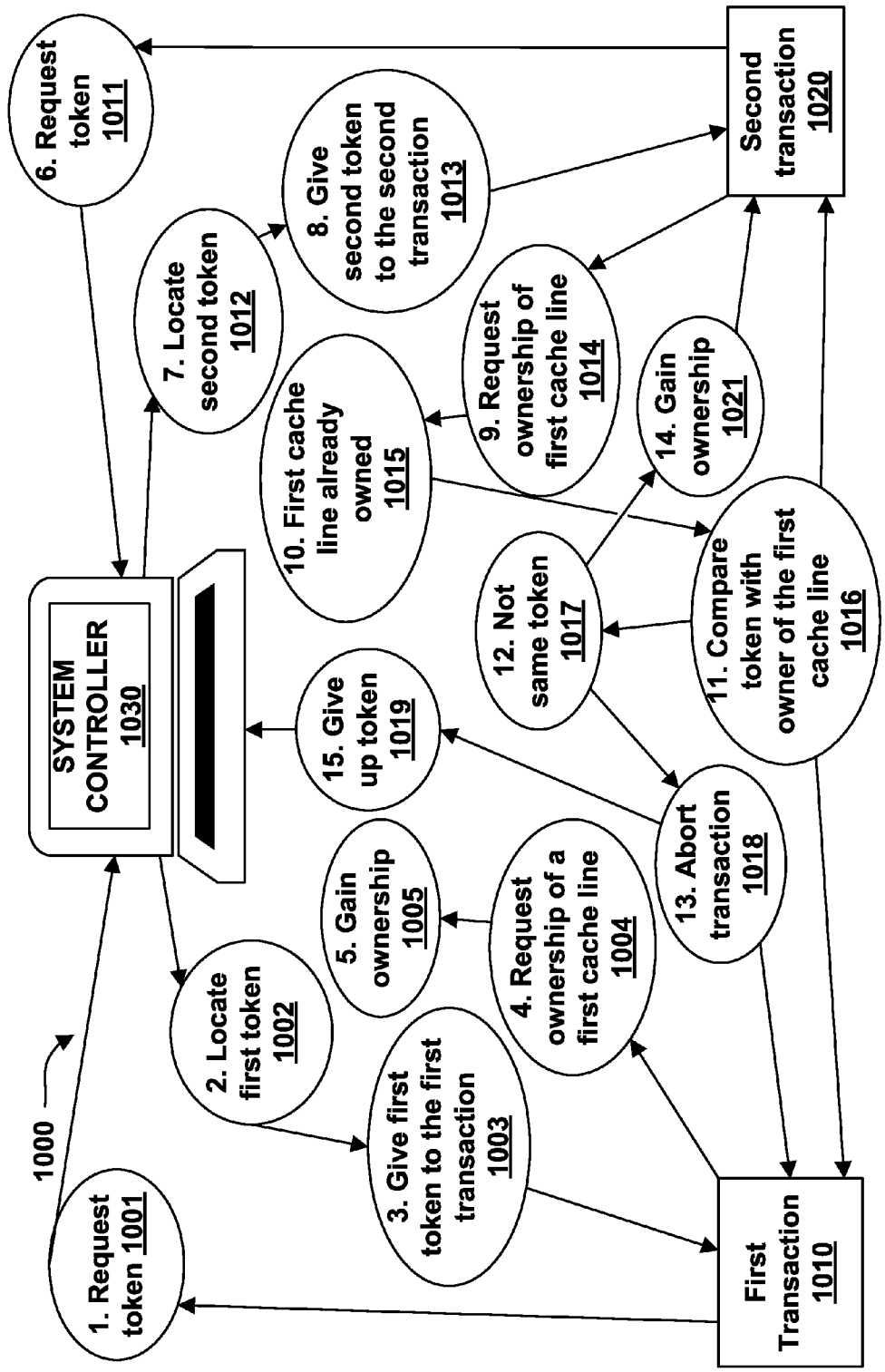
FIG. 10 depicts a diagram of a process when two hostile transactions are attempting to access the same cache line of a transactional memory execution environment, according to various embodiments.

FIG. 10 depicts a diagram of a process 1000 when two hostile transactions are attempting to access the same cache line of a transactional memory execution environment, according to various embodiments. The process 1000 may include a first transaction 1010, the second transaction 1020, and a system controller 1030. The process 1000 may begin with operation 1001. In operation 1001, the first transaction 1010 may request a token from the system controller 1030. In various embodiments, the system controller 1030 is an operating system or a hypervisor. The system controller 1030 may then locate the first token, in operation 1002, and may then give the first token to the first transaction 1010, in operation 1003. In operation 1004, the first transaction 1010 may request ownership of a first cache line. Then in operation 1005, the first transaction 1010 may gain ownership of the first cache line.

In operation 1011, the second transaction 1020 may request a token from the system controller 1030 the second transaction 1020 may not want to be a friend with the existing transaction 1010 as it requests a token. In operation 1012, the system controller 1030 may locate a second token, not compatible with the first token, and in operation 1013, the system controller 1030 may give the second token to the second transaction 1020. The second transaction 1020 may then request ownership of the first cache line in operation 1014. In operation 1015, the cache subsystem may realize that the cache line is currently owned by the cache running the first transaction 1010.

The first cache line may be required to be currently used by the first transaction 1010 for operations 1015-1021 to occur. In operation 1016, the second token, assigned to the second transaction 1020, may be compared to the first token assigned to the first transaction 1010 by a token qualifier of the cache level running the first transaction 1010. The token qualifier may be determined that the first token and the second token are not identical tokens, in operation 1017, and thus the first transaction 1010 and the second transaction 1020 may not be granted the ability to access the cache line concurrently without aborting either transaction.

In operation 1018, the first transaction 1010 may be forced to abort the current transaction. In operation 1019, the first transaction 1010 may give its token, the first token, back to the system controller 1030. In various embodiments, the system controller 1030 may reclaim the first token from the first transaction 1010. The reclaimed token may be returned to a token pool, which stores unused tokens. In other embodiments, the first transaction might retain the token to do a retry. After the first transaction 1010 is aborted, and relinquishes the cache line, the second transaction 1020 may be given ownership of the cache line in operation 1021. The steps outlined in FIG. 10 are just one example of a hostile process. Hostile transactions and processes are not limited to these operations.

Figure 11:
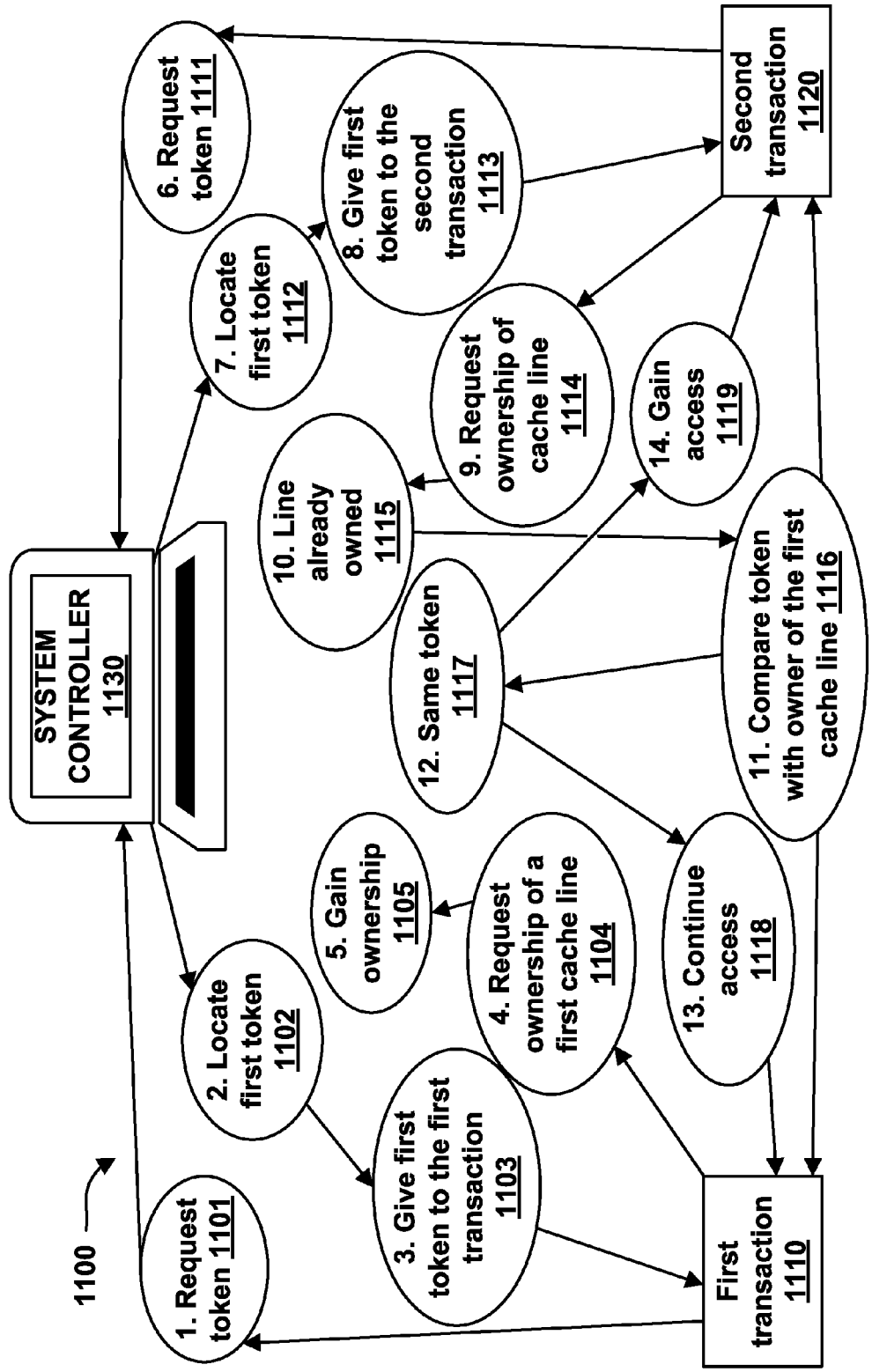
FIG. 11 depicts a diagram of a process when two friendly transactions are attempting to access the same cache line of a transactional memory execution environment, according to various embodiments.

FIG. 11 depicts a diagram of a process 1100 when two friendly transactions are attempting to access the same cache line of a transactional memory execution environment, according to various embodiments. The process 1100 may include a first transaction 1110, a second transaction 1120, and a system controller 1130. The process 1100 may begin with operation 1101. In operation 1101, the first transaction 1110 may request a token from the system controller 1130. In some embodiments, the system controller 1130 is an operating system or a hypervisor. In operation 1102, the system controller 1130 may then locate the first token. In operation 1103, the system controller may give the first token to the first transaction 1110. In operation 1104, the first transaction 1110 may request ownership of the first cache line. The first transaction 1110 may gain ownership of the first cache line in operation 1105.

In operation 1111, the second transaction 1120 may request a token from the system controller 1130. The second transaction 1120 may want to be a friend with the existing transaction 1110, as the existing transaction requests a token and provided necessary credentials. In operation 1112, the system controller 1130 may then locate the first token, and in operation 1113, the system controller 1130 may give the first token to the second transaction 1120.

In operation 1114, the second transaction 1120 may then request ownership of the first cache line. In operation 1115, the cache subsystem may realize that the cache line is currently owned by the cache running the first transaction 1110. In operation 1116, the first token, assigned to the second transaction 1120, may be compared to the first token, assigned to the first transaction 1110, by a token qualifier of the cache level running the first transaction 1110. The token qualifier may be determined that the first token and the first token are identical tokens in operation 1117, and thus the first transaction 1110 and the second transaction 1120 may be granted access the cache line concurrently without aborting either transaction. In operation 1118, the first transaction 1110 may be able to continue accessing the cache line. In operation 1119, the second transaction 1120 may also be able to gain access to the first cache line thus allowing both the first transaction 1110 and the second transaction 1120 to subsequently access the first cache line. In some embodiment, the cache line ownership may alternate between 1110 and 1120 without aborting either transactions. The steps outlined in FIG. 11 are just one example of a friendly process. Friendly transactions and processes are not limited to these operations.

In various embodiments, the second transaction 1120 may be required to wait until the first transaction 1110 has been completed before being ran on the first cache line. The second transaction 1120 may have access to the cache line but may be placed on an on hold status until the first transaction 1120 has been completed. Once the first transaction has been completed, then the second transaction may be processed.

Figure 12:
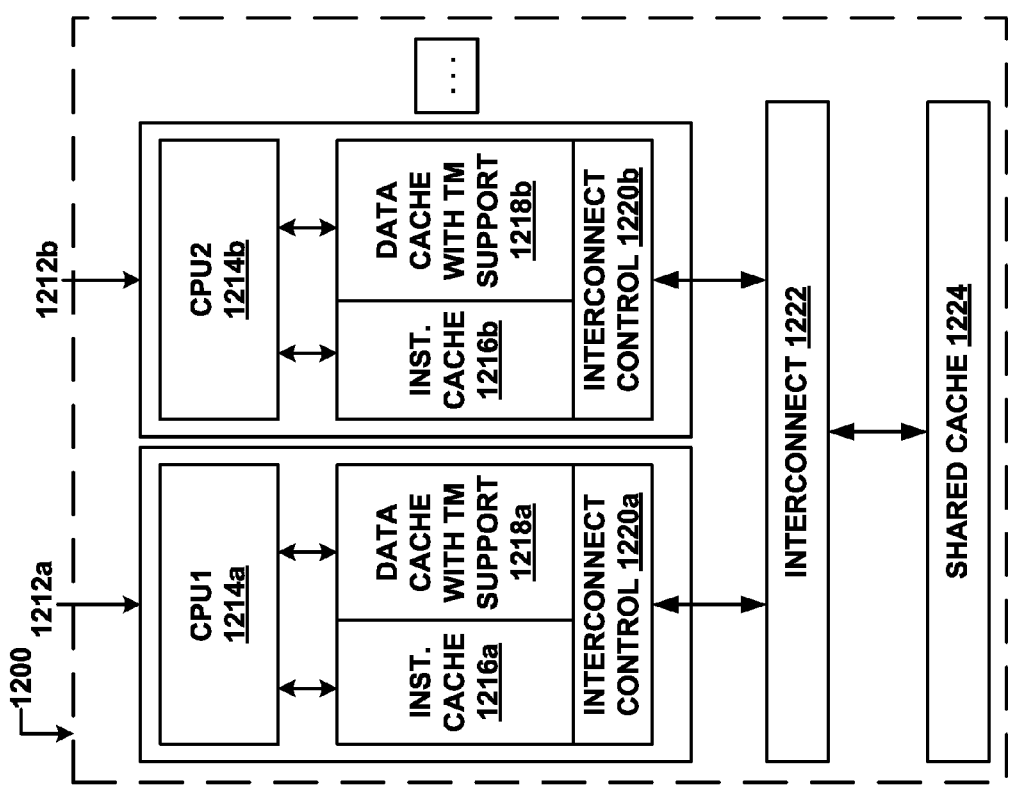
FIG. 12 depicts an example multicore transactional memory environment, according to various embodiments.
Figure 13:
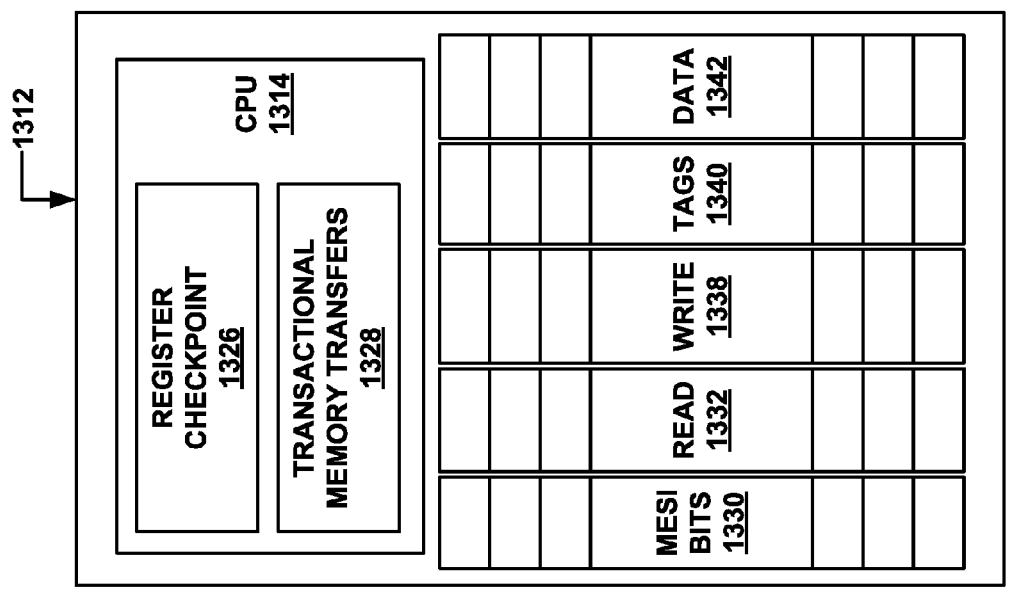
FIG. 13 depicts an example multicore transactional memory environment, according to various embodiments.

FIGS. 12 and 13 depict an example of a multicore TM environment. FIG. 12 shows many TM-enabled CPUs (CPU1 1214a, CPU2 1214b, etc.) on one die 1200, connected with an interconnect 1222, under management of an interconnect control 1220a, 1220b. Each CPU 1214a, 1214b (also known as a Processor) may have a split cache consisting of an Instruction Cache 1216a, 1216b for caching instructions from memory to be executed and a Data Cache 1218a, 1218b with TM support for caching data (operands) of memory locations to be operated on by CPU 1214a, 1214b (in FIG. 12, each CPU 1214a, 1214b and its associated caches are referenced as 1212a, 1212b). In an implementation, caches of multiple dies 1200 are interconnected to support cache coherency between the caches of the multiple dies 1200. In an implementation, a single cache, rather than the split cache is employed holding both instructions and data. In implementations, the CPU caches are one level of caching in a hierarchical cache structure. For example, each die 1200 may employ a shared cache 1224 to be shared amongst all the CPUs on the die 1200. In another implementation, each die may have access to a shared cache 1224, shared amongst all the processors of all the dies 1200.

FIG. 13 shows the details of an example transactional CPU environment 1312, having a CPU 1314, including additions to support TM. The transactional CPU (processor) 1314 may include hardware for supporting Register Checkpoints 1326 and special transactional memory transfers 1328. The transactional CPU cache may have the MESI bits 1330, Tags 1340 and Data 1342 of a conventional cache but also, for example, R bits 1332 showing a line has been read by the CPU 1314 while executing a transaction and W bits 1338 showing a line has been written-to by the CPU 1314 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

|  |  | VERSIONING | |
|---|---|---|---|
|  |  | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
|  | Pessimistic | Storing updates in a writebuffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 1338 and R 1332 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 1330 state transitions (cache line indicators corresponding to Modified, Exclusive, Shared, and Invalid code states) are left mostly unchanged. Outside of a transaction, the MESI 1330 state transitions are left completely unchanged. When reading a line inside a transaction, the standard coherence transitions apply (S (Shared)→S, I (Invalid)→S, or I→E (Exclusive)), issuing a load miss as needed, but the R 1332 bit is also set. Likewise, writing a line applies the standard transitions (S→M, E→I, I→M), issuing a miss as needed, but also sets the W 1338 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 1332 (Read), they downgrade that line to S, and in certain cases issue a cache-to-cache transfer if they have the line in MESI's 1330 M or E state. However, if the cache has the line W 1338, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 1332 or W 1338, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 1338 and R 1332 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 1332 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 1332 and/or W 1338 bits are set, then a conflict is initiated. If the line is found but neither R 1332 nor W 1338 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 1338 and R 1332 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 1338 and R 1332 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 1332, writing a line sets its W bit 1338, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 1338 and R 1332 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM® zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

|  |  |  |  |
|---|---|---|---|
|  | LHI | R0,0 | *initialize retry count=0 |
| loop | TBEGIN |  | *begin transaction |
|  | JNZ | abort | *go to abort code if CC1=0 |
|  | LT | R1, lock | *load and test the fallback lock |
|  | JNZ | lckbzy | *branch if lock busy |
|  | ... perform operation ... |  |  |
|  | TEND |  | *end transaction |
|  | ............ |  |  |
| lckbzy | TABORT |  | *abort if lock busy; this |
|  |  |  | *resumes after TBEGIN |
| abort | JO | fallback | *no retry if CC=3 |
|  | AHI | R0, 1 | *increment retry count |
|  | CIJNL | R0,6, fallback | *give up after 6 attempts |
|  | PPA | R0, TX | *random delay based on retry count |
|  | ... potentially wait for lock to become free. . . |  |  |
|  | J | loop | *jump back to retry fallback |
|  | OBTAIN | lock | *using Compare&Swap |
|  | ... perform operation ... |  |  |
|  | RELEASE | lock |  |
|  | ............ |  |  |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 1314 (FIG. 13) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| TBEGINC | *begin constrained transaction |
|---|---|
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 14:
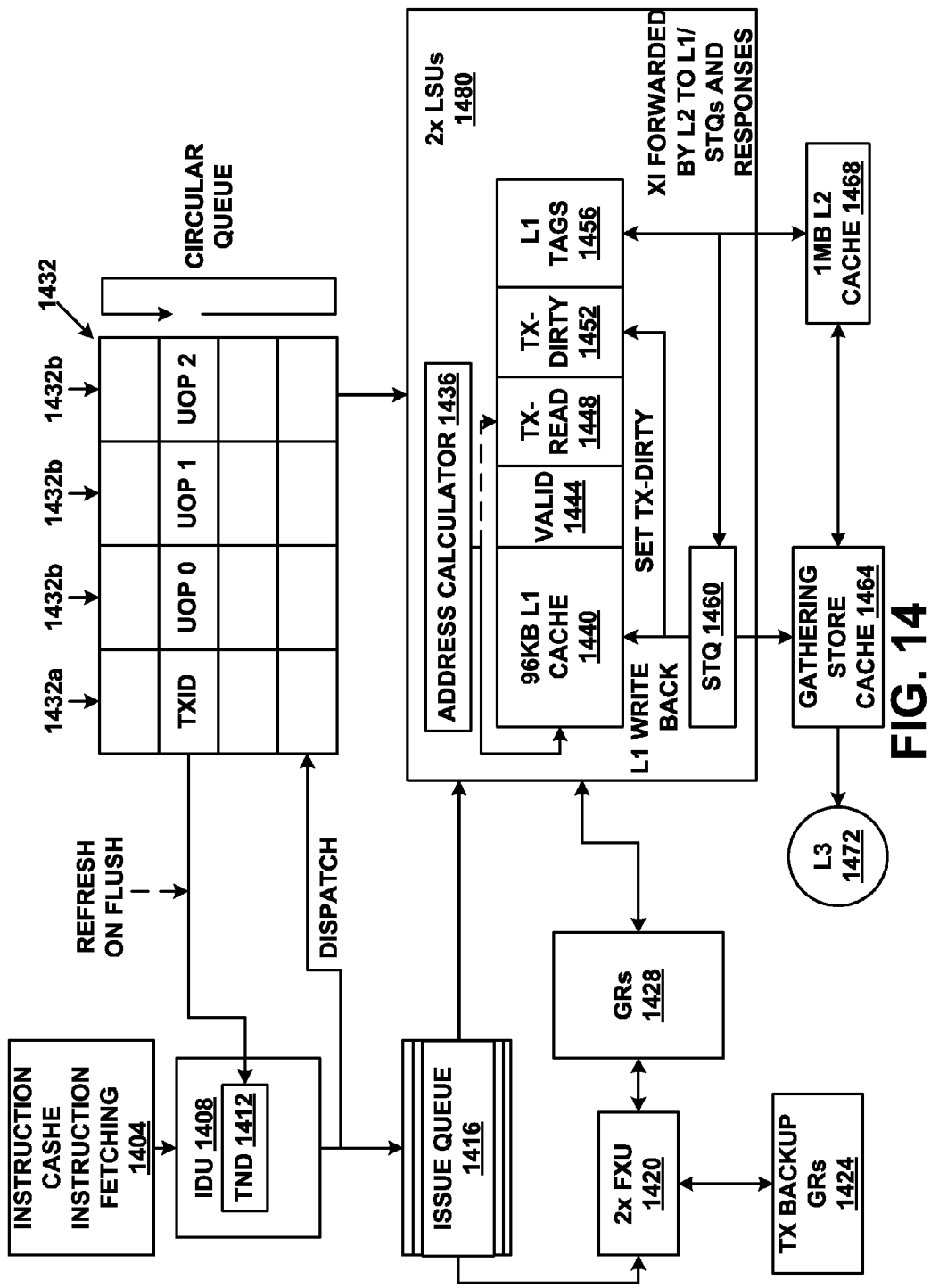
FIG. 14 depicts example components of an example CPU, according to various embodiments.

With reference to FIG. 14, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 1432b) are written into a unified issue queue 1416, from where they can be issued out-of-order. Up to two fixed-point, one floating-point, two load/store, and two branch instructions can execute every cycle. A Global Completion Table (GCT) 1432 holds every micro-op 1432b and a transaction nesting depth (TND) 1432a. The GCT 1432 is written in-order at decode time, tracks the execution status of each micro-op 1432b, and completes instructions when all micro-ops 1432b of the oldest instruction group have successfully executed.

The level 1 (L1) data cache 1440 is a 96 KB (kilo-byte) 6-way associative cache with 1456 byte cache-lines and 4 cycle use latency, coupled to a private 1 MB (mega-byte) 8-way associative 2nd-level (L2) data cache 1468 with 7 cycles use-latency penalty for L1 1440 misses. The L1 1440 cache is the cache closest to a processor and Ln cache is a cache at the nth level of caching. Both L1 1440 and L2 1468 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multiprocessor (SMP) system with up to 144 cores (not all cores are available to run customer workload).

Coherency is managed with a variant of the MESI protocol. Cache-lines can be owned read-only (shared) or exclusive; the L1 1440 and L2 1468 are store-through and thus do not contain dirty lines. The L3 1472 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 1440 and L2 1468 and requests the cache line from its local L3 1472, the L3 1472 checks whether it owns the line, and if necessary sends an XI to the currently owning L2 1468/L1 1440 under that L3 1472 to ensure coherency, before it returns the cache line to the requestor. If the request also misses the L3 1472, the L3 1472 sends a request to the L4 (not shown), which enforces coherency by sending XIs to all necessary L3s under that L4, and to the neighboring L4s. Then the L4 responds to the requesting L3 which forwards the response to the L2 1468/L1 1440.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 1440/L2 1468 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected.

Transactional Instruction Execution

FIG. 14 depicts example components of an example transactional execution environment, including a CPU and caches/components with which it interacts (such as those depicted in FIGS. 12 and 13). The instruction decode unit 1408 (IDU) keeps track of the current transaction nesting depth 1412 (TND). When the IDU 1408 receives a TBEGIN instruction, the nesting depth 1412 is incremented, and conversely decremented on TEND instructions. The nesting depth 1412 is written into the GCT 1432 for every dispatched instruction. When a TBEGIN or TEND is decoded on a speculative path that later gets flushed, the IDU's 1408 nesting depth 1412 is refreshed from the youngest GCT 1432 entry that is not flushed. The transactional state is also written into the issue queue 1416 for consumption by the execution units, mostly by the Load/Store Unit (LSU) 1480, which also has an effective address calculator 1436 is included in the LSU 1480. The TBEGIN instruction may specify a transaction diagnostic block (TDB) for recording status information, should the transaction abort before reaching a TEND instruction.

Similar to the nesting depth, the IDU 1408/GCT 1432 collaboratively track the access register/floating-point register (AR/FPR) modification masks through the transaction nest; the IDU 1408 can place an abort request into the GCT 1432 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 1432b (including, for example uop 0, uop 1, and uop2) will be executed by one of the two fixed point units (FXUs) 1420 to save a pair of GRs 1428 into a special transaction-backup register file 1424, that is used to later restore the GR 1428 content in case of a transaction abort. Also the TBEGIN spawns micro-ops 1432b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 1432b instructions; NTSTG (non-transactional store) is handled like a normal store except that it is marked as non-transactional in the issue queue 1416 so that the LSU 1480 can treat it appropriately. TEND is a no-op at execution time, the ending of the transaction is performed when TEND completes.

As mentioned, instructions that are within a transaction are marked as such in the issue queue 1416, but otherwise execute mostly unchanged; the LSU 1480 performs isolation tracking as described in the next section.

Since decoding is in-order, and since the IDU 1408 keeps track of the current transactional state and writes it into the issue queue 1416 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 1432 at completion time. The length of transactions is not limited by the size of the GCT 1432, since general purpose registers (GRs) 1428 can be restored from the backup register file 1424.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 1480 tracks cache lines that were accessed during transactional execution, and triggers an abort if an XI from another CPU (or an LRU-XI) conflicts with the footprint. If the conflicting XI is an exclusive or demote XI, the LSU 1480 rejects the XI back to the L3 1472 in the hope of finishing the transaction before the L3 1472 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 1440 is traditionally implemented with static random access memories (SRAMs). For the transactional memory implementation, the valid bits 1444 (64 rows×6 ways) of the directory have been moved into normal logic latches, and are supplemented with two more bits per cache line: the TX-read 1448 and TX-dirty 1452 bits.

The TX-read 1448 bits are reset when a new outermost TBEGIN is decoded (which is interlocked against a prior still pending transaction). The TX-read 1448 bit is set at execution time by every load instruction that is marked "transactional" in the issue queue. Note that this can lead to over-marking if speculative loads are executed, for example on a mispredicted branch path. The alternative of setting the TX-read 1448 bit at load completion time was too expensive for silicon area, since multiple loads can complete at the same time, requiring many read-ports on the load-queue.

Stores execute the same way as in non-transactional mode, but a transaction mark is placed in the store queue (STQ) 1460 entry of the store instruction. At write-back time, when the data from the STQ 1460 is written into the L1 1440, the TX-dirty bit 1452 in the L1-directory 1456 is set for the written cache line. Store write-back into the L1 1440 occurs only after the store instruction has completed, and at most one store is written back per cycle. Before completion and write-back, loads can access the data from the STQ 1460 by means of store-forwarding; after write-back, the CPU 1314 (FIG. 13) can access the speculatively updated data in the L1 1440. If the transaction ends successfully, the TX-dirty bits 1452 of all cache-lines are cleared, and also the TX-marks of not yet written stores are cleared in the STQ 1460, effectively turning the pending stores into normal stores.

On a transaction abort, all pending transactional stores are invalidated from the STQ 1460, even those already completed. All cache lines that were modified by the transaction in the L1 1440, that is, have the TX-dirty bit 1452 on, have their valid bits turned off, effectively removing them from the L1 1440 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 1440 receives an XI, L1 1440 accesses the directory to check validity of the XI'ed address in the L1 1440, and if the TX-read bit 1448 is active on the XI'ed line and the XI is not rejected, the LSU 1480 triggers an abort. When a cache line with active TX-read bit 1448 is LRU'ed from the L1 1440, a special LRU-extension vector remembers for each of the 64 rows of the L1 1440 that a TX-read line existed on that row. Since no precise address tracking exists for the LRU extensions, any non-rejected XI that hits a valid extension row the LSU 1480 triggers an abort. Providing the LRU-extension effectively increases the read footprint capability from the L1-size to the L2-size and associativity, provided no conflicts with other CPUs 114 (FIGS. 12 and 13) against the non-precise LRU-extension tracking causes aborts.

The store footprint is limited by the store cache size (the store cache is discussed in more detail below) and thus implicitly by the L2 1468 size and associativity. No LRU-extension action needs to be performed when a TX-dirty 1452 cache line is LRU'ed from the L1 1440.

Store Cache

In prior systems, since the L1 1440 and L2 1468 are store-through caches, every store instruction causes an L3 1472 store access; with now 6 cores per L3 1472 and further improved performance of each core, the store rate for the L3 1472 (and to a lesser extent for the L2 1468) becomes problematic for certain workloads. In order to avoid store queuing delays, a gathering store cache 1464 had to be added, that combines stores to neighboring addresses before sending them to the L3 1472.

For transactional memory performance, it is acceptable to invalidate every TX-dirty 1452 cache line from the L1 1440 on transaction aborts, because the L2 1468 cache is very close (7 cycles L1 1440 miss penalty) to bring back the clean lines. However, it would be unacceptable for performance (and silicon area for tracking) to have transactional stores write the L2 1468 before the transaction ends and then invalidate all dirty L2 1468 cache lines on abort (or even worse on the shared L3 1472).

The two problems of store bandwidth and transactional memory store handling can both be addressed with the gathering store cache 1464. The cache 1464 is a circular queue of 64 entries, each entry holding 128 bytes of data with byte-precise valid bits. In non-transactional operation, when a store is received from the LSU 1480, the store cache 1464 checks whether an entry exists for the same address, and if so gathers the new store into the existing entry. If no entry exists, a new entry is written into the queue, and if the number of free entries falls under a threshold, the oldest entries are written back to the L2 1468 and L3 1472 caches.

When a new outermost transaction begins, all existing entries in the store cache are marked closed so that no new stores can be gathered into them, and eviction of those entries to L2 1468 and L3 1472 is started. From that point on, the transactional stores coming out of the LSU 1480 STQ 1460 allocate new entries, or gather into existing transactional entries. The write-back of those stores into L2 1468 and L3 1472 is blocked, until the transaction ends successfully; at that point subsequent (post-transaction) stores can continue to gather into existing entries, until the next transaction closes those entries again.

The store cache 1464 is queried on every exclusive or demote XI, and causes an XI reject if the XI compares to any active entry. If the core is not completing further instructions while continuously rejecting XIs, the transaction is aborted at a certain threshold to avoid hangs.

The LSU 1480 requests a transaction abort when the store cache 1464 overflows. The LSU 1480 detects this condition when it tries to send a new store that cannot merge into an existing entry, and the entire store cache 1464 is filled with stores from the current transaction. The store cache 1464 is managed as a subset of the L2 1468: while transactionally dirty lines can be evicted from the L1 1440, they have to stay resident in the L2 1468 throughout the transaction. The maximum store footprint is thus limited to the store cache size of 64×128 bytes, and it is also limited by the associativity of the L2 1468. Since the L2 1468 is 8-way associative and has 512 rows, it is typically large enough to not cause transaction aborts.

If a transaction aborts, the store cache 1464 is notified and all entries holding transactional data are invalidated. The store cache 1464 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 1404 switches into "millicode mode" and starts fetching at the appropriate location in the millicode memory area Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 1438 to restore.

The CPU 1314 (FIG. 13) supports a special millicode-only instruction to read out the backup-GRs 1424 and copy them into the main GRs 1428. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 1408 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 1428. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 1314 (FIG. 13) to stop all conflicting work, retry the local transaction, before releasing the other CPUs 1314 to continue normal processing. Multiple CPUs 114 must be coordinated to not cause deadlocks, so some serialization between millicode instances on different CPUs 114 is required.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for granting access to a cache line in a transactional memory execution environment, comprising:
   a memory;
   a processor device; and
   a system controller communicatively coupled to the processor device and the memory, wherein the system controller is configured to:
      receive a first request from a first transaction to access a cache line;
      determine, in response to receiving the first request, that the cache line is used by a second transaction;
      determine if the first transaction and the second transaction opt-in to a transaction potential conflict check;
      perform, based on an opt-in of the first transaction and the second transaction for the transaction potential conflict check, the transaction potential conflict check between the first transaction and the second transaction in order to compare credentials and determine whether the first transaction and the second transaction are compatible, wherein performing the transaction potential conflict check includes at least determining whether the first transaction and the second transaction have a shared address space within the memory, the memory having one or more memory partitions supporting one or more address spaces, the transaction potential conflict check comprising:
         comparing a first token of the first transaction to a second token of the second transaction, and
         in response to determining that the first token is the same as the second token, determining that the first transaction and the second transaction are compatible and do not have the shared address space within the memory; and allow, in response to performing the transaction potential conflict check and determining that the first transaction and the second transaction are compatible and do not have the shared address space within the memory, concurrent access of the cache line for the first transaction and the second transaction such that the first transaction writes to the cache line and the second transaction writes to the cache line concurrently.

2. The system of claim 1, wherein the system controller is further configured to:
   obtain a first token type for the first transaction and a second token type for the second transaction based on an opt-in of the first transaction and the second transaction for the transaction potential conflict check.

3. The system of claim 2, wherein obtaining the first token type and the second token type, causes the system controller to:
   receive the first token type from a token manager and augment a transaction handling protocol with a token type assigned to the first transaction;
   complete the first transaction; and
   return the first token type to the token manager.

4. The system of claim 2, wherein the first transaction and the second transaction are determined to be compatible in response to the second token type of the second transaction being identical to the first token type of the first transaction.

5. The system according to claim 1, wherein the system controller is further configured to:
   suppress detection of cache coherent conflicts for the cache line in response to allowing concurrent access to the cache line.

6. A computer program product for granting access to a cache line in a transactional memory execution environment comprising a computer readable storage medium having a computer readable program stored therein, wherein the computer readable storage medium does not comprise a transitory signal per se, wherein the computer readable program, when executed on a computing device, causes the computing device to:
   receive a first request from a first transaction to access a cache line;
   determine, in response to receiving the first request, that the cache line is used by a second transaction;
   determine if the first transaction and the second transaction opt-in to a transaction potential conflict check;
   perform, based on an opt-in of the first transaction and the second transaction for the transaction potential conflict check, the transaction potential conflict check between the first transaction and the second transaction in order to compare credentials and determine whether the first transaction and the second transaction are compatible, wherein performing the transaction potential conflict check includes at least determining whether the first transaction and the second transaction have a shared address space within the memory, the memory having one or more memory partitions supporting one or more address spaces, the transaction potential conflict check comprising:
      comparing a first token of the first transaction to a second token of the second transaction, and
      in response to determining that the first token is the same as the second token, determining that the first transaction and the second transaction are compatible and do not have the shared address space within the memory; and
   allow, in response to performing the transaction potential conflict check and determining that the first transaction and the second transaction are compatible and do not have the shared address space within the memory, concurrent access of the cache line for the first transaction and the second transaction such that the first transaction writes to the cache line and the second transaction writes to the cache line concurrently.

7. The computer program product of claim 6, wherein the computer readable program causes the computing device to:
   obtain a first token type for the first transaction and a second token type for the second transaction based on the opt-in of the first transaction and the second transaction for the transaction potential conflict check.

8. The computer program product of claim 7, wherein obtaining the first token type and the second token type causes the computing device to:
   receive the first token type from a token manager and augment a transaction handling protocol with a token type assigned to the first transaction;
   complete the first transaction; and
   return the first token type to the token manager.

9. The computer program product of claim 7, wherein the first transaction and the second transaction are determined to be compatible in response to the second token type of the second transaction being identical to the first token type of the first transaction.

10. The computer program product according to claim 6, wherein the computer readable program further causes the computing device to:
- suppress detection of cache coherent conflicts for the cache line in response to allowing concurrent access to the cache line.

* * * * *